United States Patent [19]
Nookala et al.

[11] Patent Number: 5,812,858
[45] Date of Patent: Sep. 22, 1998

[54] METHOD AND APPARATUS FOR PROVIDING REGISTER AND INTERRUPT COMPATIBILITY BETWEEN NON-IDENTICAL INTEGRATED CIRCUITS

[75] Inventors: Narasimha R. Nookala, San Jose; Ashutosh S. Dikshit, Mountain View; Daniel G. Bezzant, Pleasanton; Stephen A. Smith, Palo Alto; Jihad Y. Abudayyeh; Arunachalam Vaidyanathan, both of Fremont, all of Calif.

[73] Assignee: Cirrus Logic, Inc., Fremont, Calif.

[21] Appl. No.: 719,596

[22] Filed: Sep. 25, 1996

Related U.S. Application Data

[63] Continuation of Ser. No. 308,166, Sep. 16, 1994, abandoned.
[51] Int. Cl.$^6$ ........................................... G06F 9/46
[52] U.S. Cl. .............................................. 395/733
[58] Field of Search .................... 395/733, 734, 395/741, 500

[56] References Cited

U.S. PATENT DOCUMENTS

| | | | |
|---|---|---|---|
| 4,081,858 | 3/1978 | Koblasz et al. | 364/553 |
| 4,589,066 | 5/1986 | Lam et al. | 364/200 |
| 4,677,548 | 6/1987 | Bradley | 364/200 |
| 4,980,822 | 12/1990 | Brantley, Jr. et al. | 364/200 |
| 5,107,462 | 4/1992 | Grundmann et al. | 365/189.02 |
| 5,123,094 | 6/1992 | MacDougall | 395/375 |
| 5,218,707 | 6/1993 | Little et al. | 395/800 |
| 5,404,318 | 4/1995 | Hoffert et al. | 364/551.01 |
| 5,506,997 | 4/1996 | Maguire et al. | 395/800 |
| 5,619,703 | 4/1997 | Omid et al. | 395/734 |
| 5,619,706 | 4/1997 | Young | 395/741 |

*Primary Examiner*—Glenn A. Auve
*Attorney, Agent, or Firm*—William Alford; Robert P. Bell; J. P. Violette

[57] ABSTRACT

An apparatus for providing register compatibility between integrated circuits having different register and interrupt configurations is designed to operate with software that was written for previous hardware. Versions of software written for previous hardware attempt non-native register accesses for which the integrated circuit is designed to emulate the non-native register set. Versions of software specifically written for the present hardware attempt native register accesses for which no emulation is necessary. In the preferred embodiment only one physical register set is included on the integrated circuit and a compatibility engine is used when a non-native register access is attempted. The compatibility engine is coupled between a bus interface unit and the physical register set and allows a user or system designer to address a register set of another integrated circuit having a different configuration than the physical register set. The compatibility engine converts the address and maps the data bits of the emulated register into registers within the physical register set. Alternatively, two sets of registers can be physically included on the integrated circuit. An interrupt compatibility circuit is also designed to operate in at least a first mode or a second mode. In the first mode the interrupt information is written to an appropriate register and then mapped into the appropriate bits of the physical register set. In the second mode the interrupt information is written directly to the appropriate register. In both the first and second modes, steering bits from the appropriate register are used to map system, management and wakeup interrupts to the appropriate interrupt pad where the interrupt request signal is then shaped.

25 Claims, 23 Drawing Sheets

Microfiche Appendix Included
(2 Microfiche, 173 Pages)

5,812,858

METHOD AND APPARATUS FOR PROVIDING REGISTER AND INTERRUPT COMPATIBILITY BETWEEN NON-IDENTICAL INTEGRATED CIRCUITS

This application is a continuation of application Ser. No. 08/308,166, filed Sep. 16, 1994 now abandoned.

REFERENCE TO MICROFICHE APPENDICES

Reference is made to the Microfiche Appendix submitted as appendices which will not be printed as per 37 C.F.R. §1.96(b). The Appendix is a computer program listing in VHDL (VHSIC Hardware Description Language) for the logic blocks of the present invention.

FIELD OF THE INVENTION

The present invention relates to the field of compatibility between integrated circuits having different register and interrupt configurations. More particularly, the present invention relates to the field of compatibility between integrated circuits designed to work in different environments and having different register and interrupt configurations.

BACKGROUND OF THE INVENTION

Modern digital systems such as the systems illustrated in FIGS. 1A and 1B typically include multiple integrated circuits. Each integrated circuit is designed to operate within specific systems and environments and to perform the tasks and operations required for its operation within those systems and environments. Designing and writing the system software for a complex digital system requiring multiple integrated circuits, usually from multiple manufacturers, can be a very difficult and time-consuming task for a system designer. When it is necessary to upgrade or replace one of the circuits within the system, the system software may be rendered obsolete, if the replacement circuit is incompatible with the previous circuit, and new system software will have to be created in order to utilize the replacement circuit.

A block diagram of a computer system having two Personal Computer Memory Card International Association (PCMCIA) expansion slots is illustrated in FIG. 1A. The PCMCIA is an association which sets standards and specifications by which a peripheral device communicates to a host adapter or CPU through an interface. The PCMCIA standard enables memory and I/O devices to be inserted as exchangeable peripherals into personal and hand-held computers through an interface port. PCMCIA slots 106 or 107 use this standard interface to allow appropriately designed peripheral devices including a modem card, a network card, a sound card, a floppy disk drive and a hard disk drive to be plugged into the system computer 102. Such peripherals are represented as a PCMCIA card 104 or 105. This PCMCIA card 104 is plugged into a PCMCIA expansion slot 106 which is coupled to a PCMCIA host adapter A (PAA) 108 within the computer system 102. The PCMCIA host adapter A (PAA) 108 serves as the interface and controls communications between the system bus 112 and the PCMCIA card 104. The system illustrated in FIG. 1A includes two PCMCIA expansion slots 106 and 107 which are controlled by a single PCMCIA host adapter A (PAA) 108. The PCMCIA card A 105 plugs into the PCMCIA expansion slot 107 and the PCMCIA card B 104 plugs into the PCMCIA expansion slot 106.

In the system illustrated in FIG. 1A, a computer system 102 is coupled to a display 101. Within the computer system 102, a CPU 110 is coupled to a PCMCIA host adapter A (PAA) 108, to a system memory 113, to a floppy disk drive 120, to a hard disk drive 121, to a graphics controller 122 and to a keyboard 123 by the system busses 112. The PCMCIA host adapter A (PAA) 108 is also coupled to the two expansion slots 106 and 107 by the PCMCIA busses 115 and 114, respectively. As peripherals are added to the system, a PCMCIA card 104 or 105 is plugged into one of the PCMCIA expansion slots 106 or 107.

The PCMCIA host adapter A 108 of the computer system illustrated in FIG. 1A is configured to operate with the ISA system bus 112. The computer system illustrated in FIG. 1B includes a PCMCIA host adapter B (PAB) 208 which is configured to operate with the PCI system bus 312. Because they are configured to operate with different system busses, the PCMCIA host adapter B 208 includes a different register set than the PCMCIA host adapter A 108.

A block diagram of the PCMCIA host adapter A (PAA) 108 is illustrated in FIG. 2. Within the PCMCIA host adapter A (PAA) 108 a bus interface unit 224 is coupled to the system bus 112 by the bus 230 and to the register set 220 by the busses 232 and 233. The register decode circuits 241–245 are integrally formed within the register set 220 and are coupled to the bus 232. The register decode circuits 241–245 are each coupled to one or more of the registers 251–257. The PCMCIA bus 115 which is coupled to the PCMCIA expansion slot 106 and the PCMCIA bus 114 which is coupled to the PCMCIA expansion slot 107 are both coupled to a PCMCIA bus interface (not shown). The PCMCIA bus interface is coupled to the bus interface 224 in order for data to be bidirectionally transferred between the ISA system bus 112 and the PCMCIA bus 114 or PCMCIA bus 115. The registers 251–257 are 8 bits wide and control, monitor, and perform other functions within the PCMCIA host adapter A related to the bidirectional transfer of data between the two interfaces.

The PCMCIA host adapter A (PAA) 108 could be any one of multiple adapters designed for this purpose, including the PCMCIA Host Adapters Part Nos. CL-PD6710, CL-PD6720 and CL-PD6722, which are currently commercially available from Cirrus Logic, Inc. of 3100 West Warren Ave., Fremont, Calif. 94538. The PCMCIA Host Adapter CL-PD6710 was designed to control one PCMCIA expansion slot and the PCMCIA Host Adapters CL-PD6720 and CL-PD6722 were each designed to control two PCMCIA expansion slots. Each of these three host adapters were designed to operate in a system utilizing an ISA system bus.

The ISA bus standard is used in almost every IBM PC or PC clone and accordingly has become a very popular bus standard. The ISA bus standard was created by IBM and has a 16 bit wide data path and a 24 bit wide address bus. The ISA bus is asynchronous and commonly operates with system clock rates up to 8 MHz. Because the ISA bus standard has remained fixed, it has become limited for use in conjunction with modern high speed microprocessors.

Another popular bus standard is the PCI bus standard, co-sponsored by Intel Corporation for use in high performance computers. The PCI bus standard is a synchronous bus operating with a clock rate up to 33 MHZ which provides data transfer faster than the ISA bus standard. The PCI bus standard utilizes a 32 bit wide data bus and a 32 bit wide address bus.

Within certain integrated circuits, such as the PCMCIA host adapter A (PAA) 108, it is necessary to include storage registers, used for the temporary storage of binary information required for the operation of the integrated circuit.

These storage registers can be accessed by either read or write operations to the address within the memory or I/O space where the register is located within the system. Registers can be either bit-enabled, where binary data is input or output one bit at a time, or parallel, where all the bits of the register are input and output simultaneously on command. A register can also be either general purpose, where it is used for several functions under program control or dedicated to perform certain functions only.

A schematic block diagram of the previous interrupt scheme utilized in the PCMCIA host adapter A 108 is illustrated in FIG. 11. This system includes two types of interrupts, management and system. The management interrupt signal line 1135 is coupled as an input to the pulse/level control circuit 1112. The pulse/level control signal line 1110 is coupled to the pulse/level control circuit 1112 for shaping the interrupt request signal and determining whether it is output as a pulse or level signal. The output of the pulse/level control circuit 1112 is coupled as an input to the active-hi/active-lo control circuit 1113. The active-hi/active-lo control signal line 1111 is coupled to the active-hi/active-lo control circuit 1113 for shaping the interrupt request signal and determining whether it is output as an active high or active low signal. The output of the active-hi/active-lo control circuit 1113 is coupled as an input to the management interrupt steering circuit 1114. The management interrupt steering bits 1121–1124 are coupled as inputs to the management interrupt steering circuit 1114 for steering the management interrupt request signal output from the management interrupt steering circuit 1114 to the appropriate one of the interrupt request pads 1100–1109. Each of the interrupt request pads 1100–1109 for the PCMCIA host adapter A is coupled to a device for requesting an interrupt from that device.

The system interrupt signal line 1115 is coupled as an input to the pulse/level control circuit 1118. The pulse/level control signal line 1116 is coupled to the pulse/level control circuit 1118 for shaping the system interrupt request signal and determining whether it is output as a pulse or level signal. The output of the pulse/level control circuit 1118 is coupled as an input to the active-hi/active-lo control circuit 1119. The active-hi/active-lo control signal line 1117 is coupled to the active-hi/active-lo control circuit 1119 for shaping the system interrupt request signal and determining whether it is output as an active high or an active low signal. The output of the active-hi/active-lo control circuit 1119 is coupled as an input to the system interrupt steering circuit 1120. The system interrupt steering bits 1125–1128 are coupled as inputs to the system interrupt steering circuit 1120 for steering the system interrupt request signal output from the system interrupt steering circuit 1120 to the appropriate one of the interrupt request pads 1100–1109.

The management interrupt steering bits 1121–1124 are stored in bits 0–3 of the control register 03h. The system interrupt steering bits 1125–1128 are stored in bits 4–7 of the control register 05h. A pulse or level waveform for system and management interrupts is selected by setting bits 2 and 3 in the miscellaneous control 1 register 16h to control the pulse/level control circuits 1118 and 1112. An active hi or active low waveform is selected by setting bits 3 and 4 in the extension control 1 register 2Fh to control the active-hi/active-lo control circuits 1113 and 1119.

The interrupt scheme implemented by the PCMCIA host adapter A, as illustrated in FIG. 11, uses either the pulse/level control circuit 1112 or 1118 and the active-hi/active-lo control circuit 1113 or 1119 to shape the interrupt request signal before it is steered to the appropriate one of the interrupt request pads 1100–1109. For this reason, the management interrupts and correspondingly, the system interrupts can only have one waveform shape at a time.

A system software program is written by a system designer to specifically access the registers of each integrated circuit, at their specific address within the system. Specific integrated circuits such as the CL-PD6710, CL-PD6720, CL-PD6722, and CL-PD6729 manufactured by Cirrus Logic Inc., are designed for specific environments, particularly systems using an ISA system bus, and typically will not operate in other environments. For this reason, a different integrated circuit, such as the PCMCIA host adapter B (PAB) 208, will have to be substituted if the system environment for the integrated circuit is changed. It is likely that this substituted integrated circuit will not include the same register or interrupt configurations as the previous integrated circuit. The system designer, when designing a system for a different environment must now rewrite the system software to operate with the substituted integrated circuit.

Integrated circuits are constantly being enhanced or upgraded to add new features and capabilities, which will improve the performance and efficiency of the integrated circuit. Integrated circuits are also modified to work in different environments or types of systems. It is possible that with an enhancement, upgrade or modification of an integrated circuit the register or interrupt configuration within the integrated circuit will change. For a system designer who desires to utilize an enhanced or modified integrated circuit in place of an older circuit, it may be necessary to rewrite the system software in order to utilize the new integrated circuit in their system. This can be a very time consuming and costly endeavor.

What is needed is a method and apparatus for providing register compatibility between enhanced or modified integrated circuits and the integrated circuit that is being replaced. What is also needed is a method and apparatus for maintaining compatibility between two integrated circuits, designed to perform the same function, but each designed for a different environment. What is further needed is a method and apparatus which allows the manufacturer of an integrated circuit to include in that integrated circuit a method, which is transparent to the system designer, allowing the system designer to utilize software written for an integrated circuit with different register and interrupt configurations. In this way a system designer can provide a system that can operate using software designed for another environment or write new software which can take advantage of a different register and interrupt configuration. What is further needed is an interrupt scheme which uses only one set of steering logic and shapes the interrupt request waveform at each interrupt request pad.

SUMMARY OF THE INVENTION

An apparatus for providing register compatibility between integrated circuits having different register and interrupt configurations is designed to operate with software that was written for previous hardware. Previous versions of software written for previous hardware attempt non-native register accesses for which the integrated circuit is designed to emulate the non-native register set. Versions of software specifically written for the present hardware attempt native register accesses for which no emulation is necessary. In the preferred embodiment only one physical register set is included on the integrated circuit and a compatibility engine is used when a non-native register access is attempted. The compatibility engine is coupled between a bus interface unit and the physical register set and allows a user or system designer to address a register set of another integrated circuit having a different configuration than the physical register set. The compatibility engine converts the address and maps the data bits of the emulated register into registers within the physical register set.

Alternatively, two sets of registers can be physically included on the integrated circuit, a first set corresponding to the register set of the other integrated circuit and a second set corresponding to the resident register set of the respective integrated circuit. In this alternative case, a multiplexer is coupled to the first and second register sets and the signals from the first and second register sets are multiplexed into the logic circuits on the integrated circuit according to which mode the integrated circuit is operating.

An interrupt compatibility circuit is also designed to operate in at least a first mode or a second mode. In the first mode the interrupt compatibility circuit is designed to accept interrupts directed to another integrated circuit. The interrupt information is written to an appropriate register. This information is then mapped into the appropriate bits of the physical register set. In the second mode the interrupt information is written directly to the appropriate register. In both the first and second modes, steering bits are used to map system, management and wakeup interrupts to the appropriate interrupt pad. The interrupt request signal is shaped at each individual interrupt request pad.

DETAILED DESCRIPTION OF THE PREFERRED EMBODIMENT

Figure 1A:
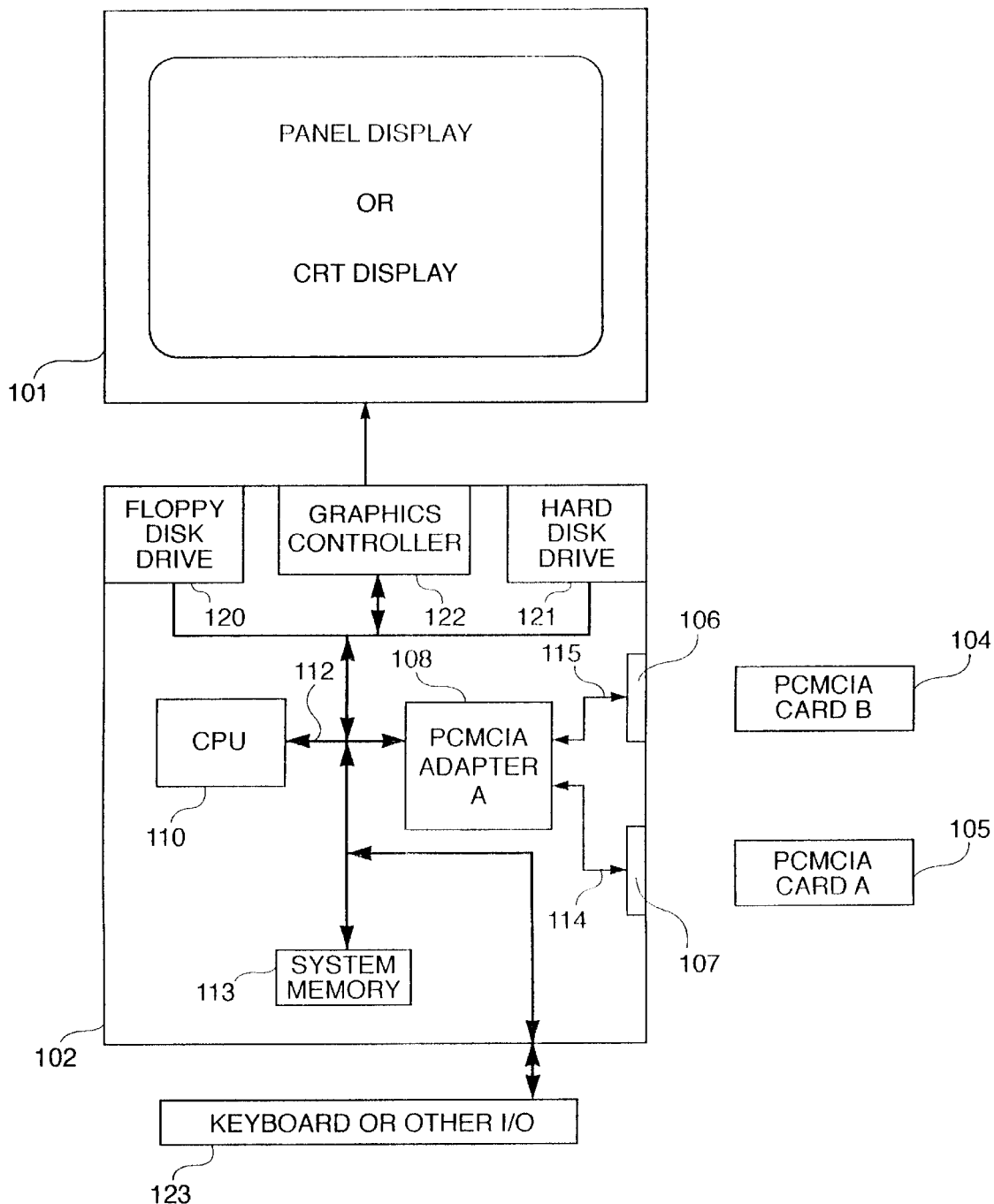
FIG. 1A illustrates a block diagram of a computer system having two PCMCIA expansion slots and a first PCMCIA host adapter designed to operate with a first system bus.
Figure 1B:
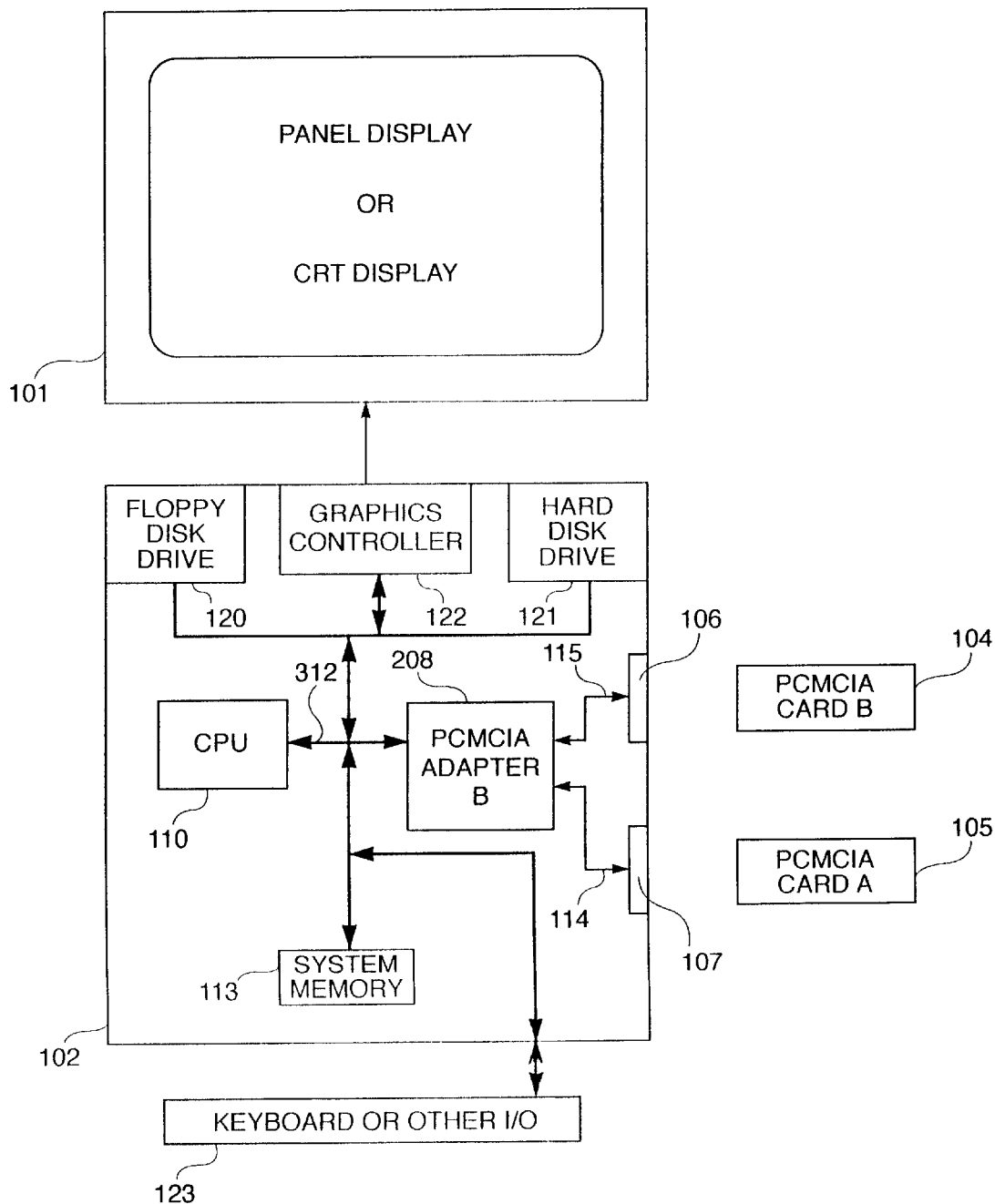
FIG. 1B illustrates a block diagram of a computer system having two PCMCIA expansion slots and a second PCMCIA host adapter designed to operate with a second system bus.
Figure 2:
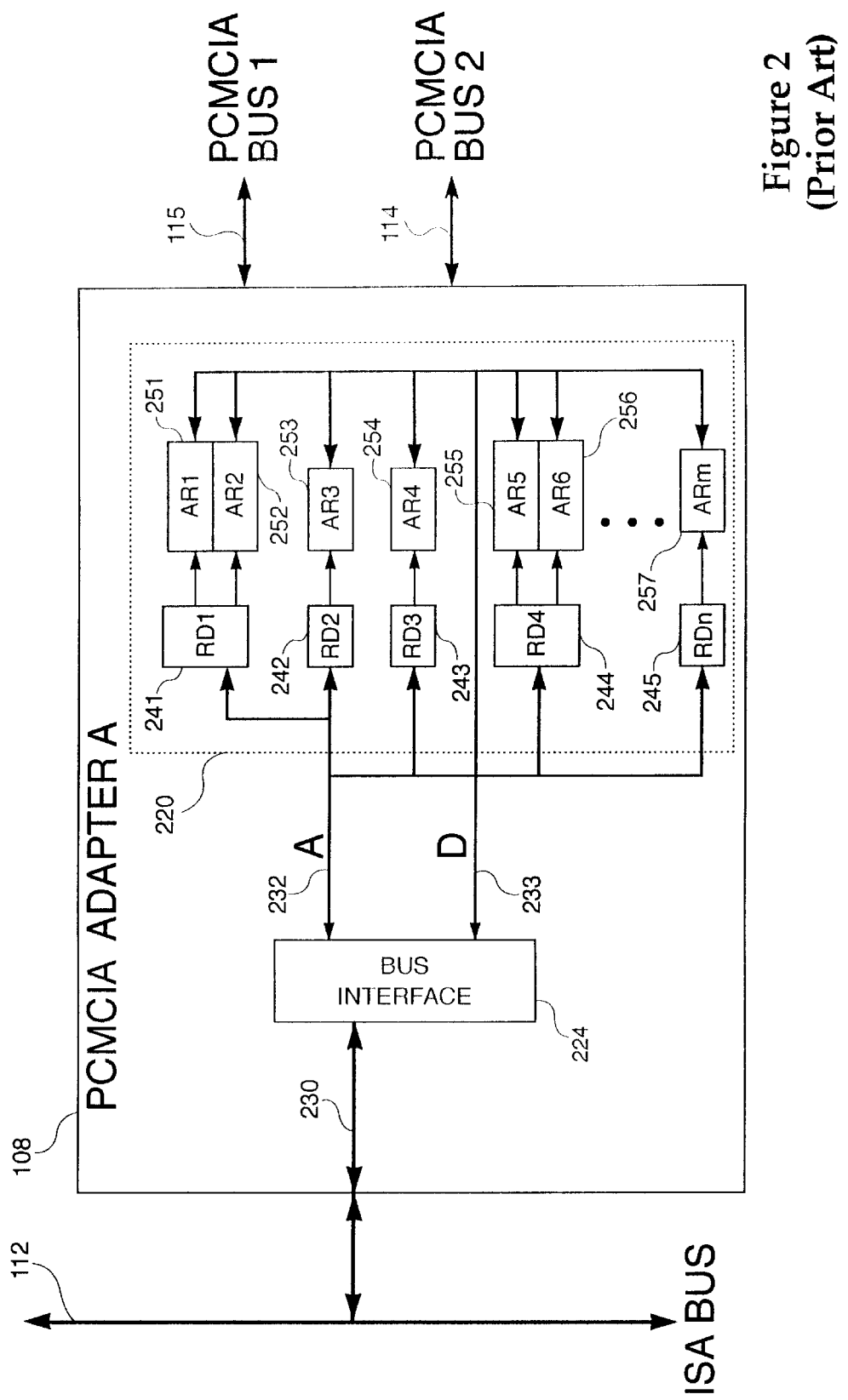
FIG. 2 illustrates a block diagram of a PCMCIA host adapter.

The preferred embodiment of the present invention is included in an enhanced and modified version of the Part Nos. CL-PD6710, CL-PD6720 and CL-PD6722 which are designed to work in a system using a PCI bus. For convenience, throughout the remainder of this document, the previous Host Adapters CL-PD6710, CL-PD6720 and CL-PD6722 will collectively be referred to as the PCMCIA host adapter A (PAA) 108 which is illustrated in FIGS. 1A and 2.

For convenience the PCMCIA host adapter which includes the present invention will be referred to as the PCMCIA host adapter B (PAB), which was designed to replace the PCMCIA host adapter A 108 and work in a system using a PCI bus. The register configuration of the PCMCIA host adapter B is different than the register configuration of the PCMCIA host adapter A 108. For this reason, unless the PCMCIA host adapter B is designed to allow a user or system designer to access the register set of the host adapter A 108, a system designer who wishes to upgrade to a PCMCIA host adapter B will have to rewrite their system software to use the register set of the PCMCIA host adapter B. To allow the system designer who designed a system according to the PCMCIA host adapter A 108 to upgrade to a PCMCIA host adapter B without rewriting their system software, the PCMCIA host adapter B of the present invention has been designed to emulate the register set of the host adapter A 108 and allow a user or system designer to use system software designed for the PCMCIA host adapter A 108, with the PCMCIA host adapter B. Because of the improvements provided by the present invention, the system designer can access the register set on the PCMCIA host adapter B as if the register set on the PCMCIA host adapter A 108 were being accessed. This allows a system designer to utilize the PCMCIA host adapter B in a system designed for the PCMCIA host adapter A 108 and access the register set of the PCMCIA host adapter A 108 without modifying the system software.

Figure 3:
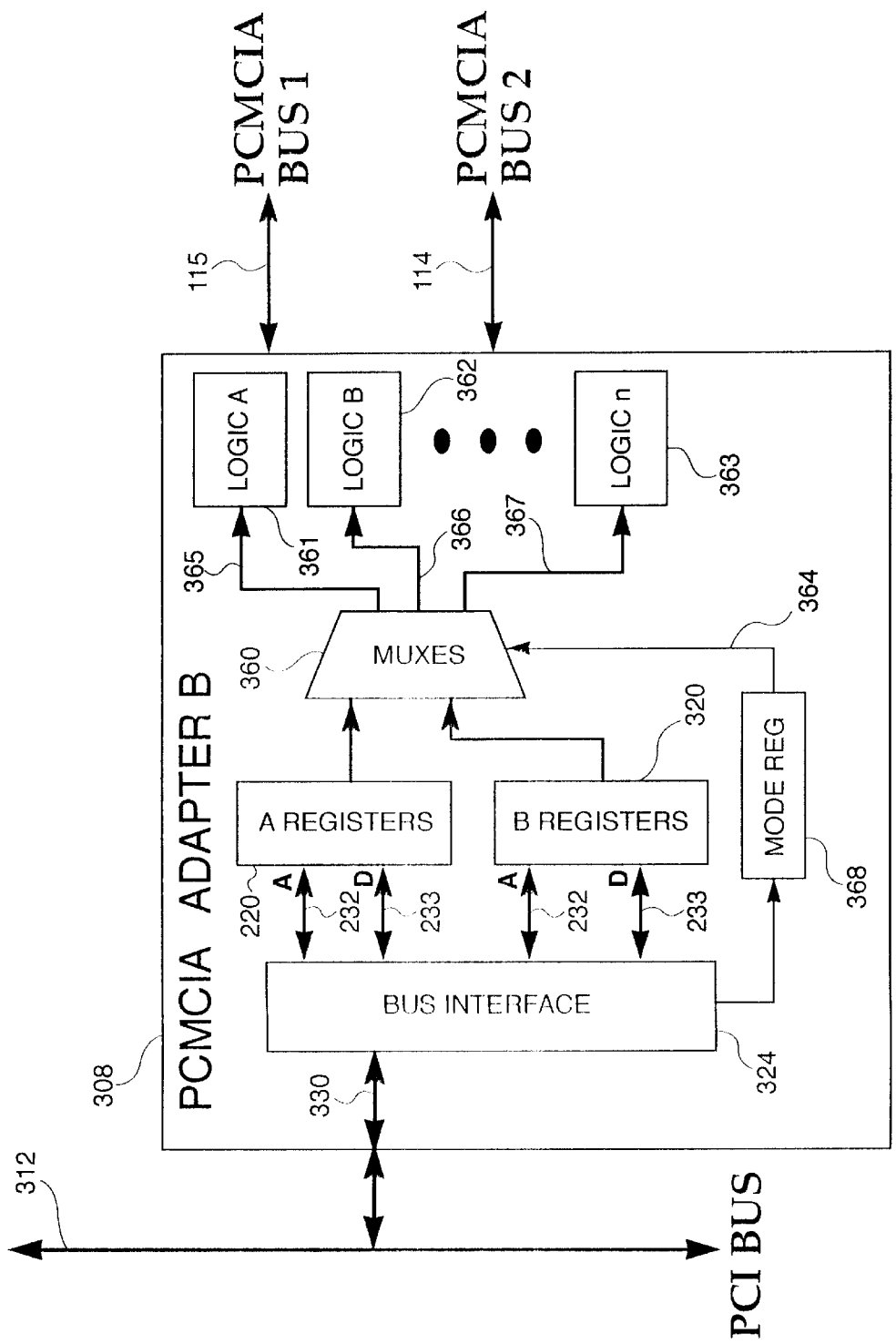
FIG. 3 illustrates a first embodiment of the PCMCIA host adapter of the present invention.

A first embodiment of the PCMCIA host adapter B is illustrated in FIG. 3. In this embodiment the PCMCIA host adapter B 308 includes two register sets 220 and 320, physically located within the PCMCIA host adapter B 308. The first register set 220 represents the register set of the PCMCIA host adapter A 108 and the second register set 320 represents the register set of the PCMCIA host adapter B 308. The PCMCIA host adapter B 308 can be operated in a first mode to appear as the PCMCIA host adapter A 108 to the system and use the register set 220 which corresponds to the register set of the PCMCIA host adapter A 108 or the PCMCIA host adapter B 308 can be operated in a second mode where its own register set 320 can be accessed directly by the system. Either of the register sets 220 or 320 can be used depending on the mode in which the PCMCIA host adapter B 308 is being operated. The A register set 220 will have addresses corresponding to addresses used for accessing the registers within the PCMCIA host adapter A 108. The B register set 320 will have addresses different than the A register set 220.

In the PCMCIA host adapter B 308 illustrated in FIG. 3, the bus interface unit 324 is coupled to the system bus 312 by the bus 330. The bus interface unit 324 is also coupled to the A register set 220 by the address bus 232 and the data bus 233. The bus interface unit 324 is coupled to the B register set 320 by the address bus 332 and the data bus 333. The A register set 220 is also coupled to an input of the multiplexer 360. The B register set 320 is also coupled to an input of the multiplexer 360. A mode register bit within the mode register 368 is initially set to determine which register set A or B will be multiplexed to control logic circuits within the PCMCIA host adapter B. The mode register bit is driven onto the control signal line 364 which is coupled to the multiplexer 360 to control the mode that the host adapter B 308 is operating in. The multiplexer outputs 365, 366 and 367 are coupled to the inputs of the logic circuits 361, 362 and 363 which control communication between the PCMCIA host adapter B 308 and the PCMCIA busses 114 and 115.

The mode register bit and control signal line 364 is programmed by the system designer according to the mode in which the PCMCIA host adapter B 308 is to operate and which one of the register sets 220 or 320 is being used. If the PCMCIA host adapter B 308 is to operate in the first mode using the register set 220 of the PCMCIA host adapter A 108 then the control signal line 364 is programmed so that the multiplexer 360 will pass through the signals from the A register set 220 to the logic circuits 361, 362 and 363. If the PCMCIA host adapter B 308 is to operate in the second mode using its own register set 320 then the control signal line 364 is programmed so that the multiplexer 360 will pass through the signals from the B register set 320 to the logic circuits 361, 362 and 363. While this embodiment, described above in reference to the PCMCIA host adapter B 308 illustrated in FIG. 3, will achieve the desired result, it is not the preferred embodiment of the present invention because it requires additional hardware, including two resident register sets 220 and 320, a multiplexer 360 and additional signal line routing on the integrated circuit.

COMPATIBILITY—THE PREFERRED EMBODIMENT

Figure 4:
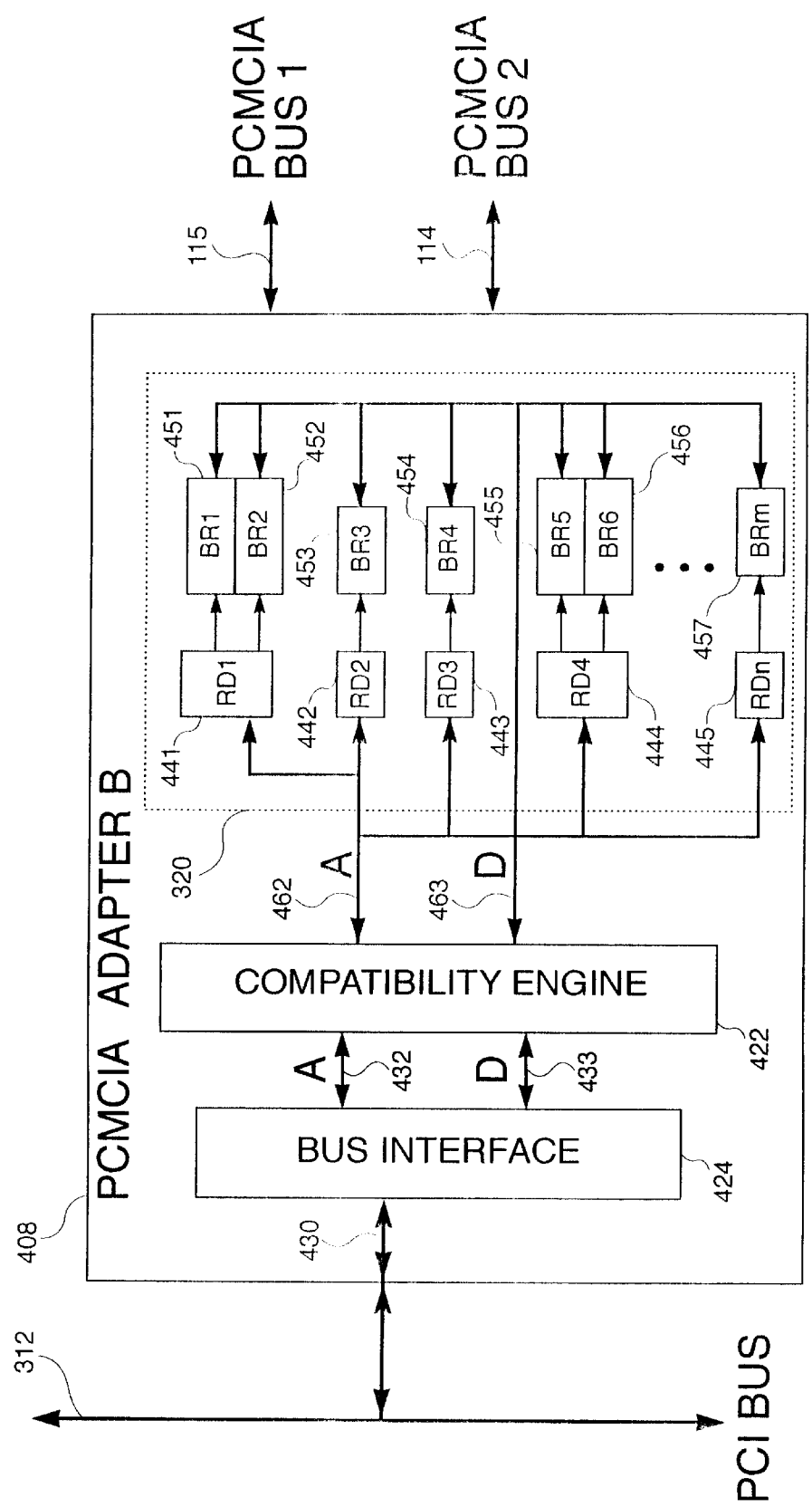
FIG. 4 illustrates a preferred embodiment of the PCMCIA host adapter of the present invention.

A block diagram of the PCMCIA host adapter B 408 of the preferred embodiment is illustrated in FIG. 4. This PCMCIA host adapter B 408 is advantageous over the PCMCIA host adapter B 308 because it uses a single register set, B register set 320, reduced signal routing, and minimal design changes to provide compatibility to previous software and hardware designs. Operation of both the first mode and second mode as discussed above is automatic and transparent to the system designer. Register accesses associated with the first mode as discussed above are known as a non-native access. Register accesses associated with the second mode as discussed above are known as a native register access. If a non-native register access is requested the PCMCIA host adapter B 408 emulates the register set 220 of the PCMCIA host adapter A 108 by using the compatibility engine 422 to map the bits directed to or from the register set 220 of the PCMCIA host adapter A 108 to or from the multiple physical registers within the native register set B 320. If a native register access is requested the PCMCIA host adapter B 408 operates using its own register set 320 and data signals are steered from the bus interface unit 424 to or from the register set B 320. For both non-native and native register accesses, control signals are generated by compatibility engine to control the access to the register set B. Non-native register accesses are usually generated by previous versions of software that were designed for the PCMCIA host adapter A. Native or non-native register accesses can be determined by what address space is being addressed and what control signals are accordingly generated. This will be further discussed below.

Within the PCMCIA host adapter B 408 illustrated in FIG. 4, the bus interface unit 424 is coupled to the system bus 312 by the bus 430. The bus interface unit 424 is coupled to the compatibility engine 422 by the address bus 432 and the data bus 433. The compatibility engine 422 is coupled to the B register set 320 by the address bus 462 and the data bus 463. Within the B register set 320 the address bus 462 is coupled to the register decode circuits 441–445. Each of the register decode circuits 441–445 are coupled to one or more of the registers 451–457. The data bus 463 is also coupled to each of the registers 451–457. The PCMCIA bus 115 which is coupled to the PCMCIA expansion slot 106 and the PCMCIA bus 114 which is coupled to the PCMCIA expansion slot 107 are both coupled to the registers 451–457 and also to the compatibility engine 422 by the bus 463.

Figure 5:
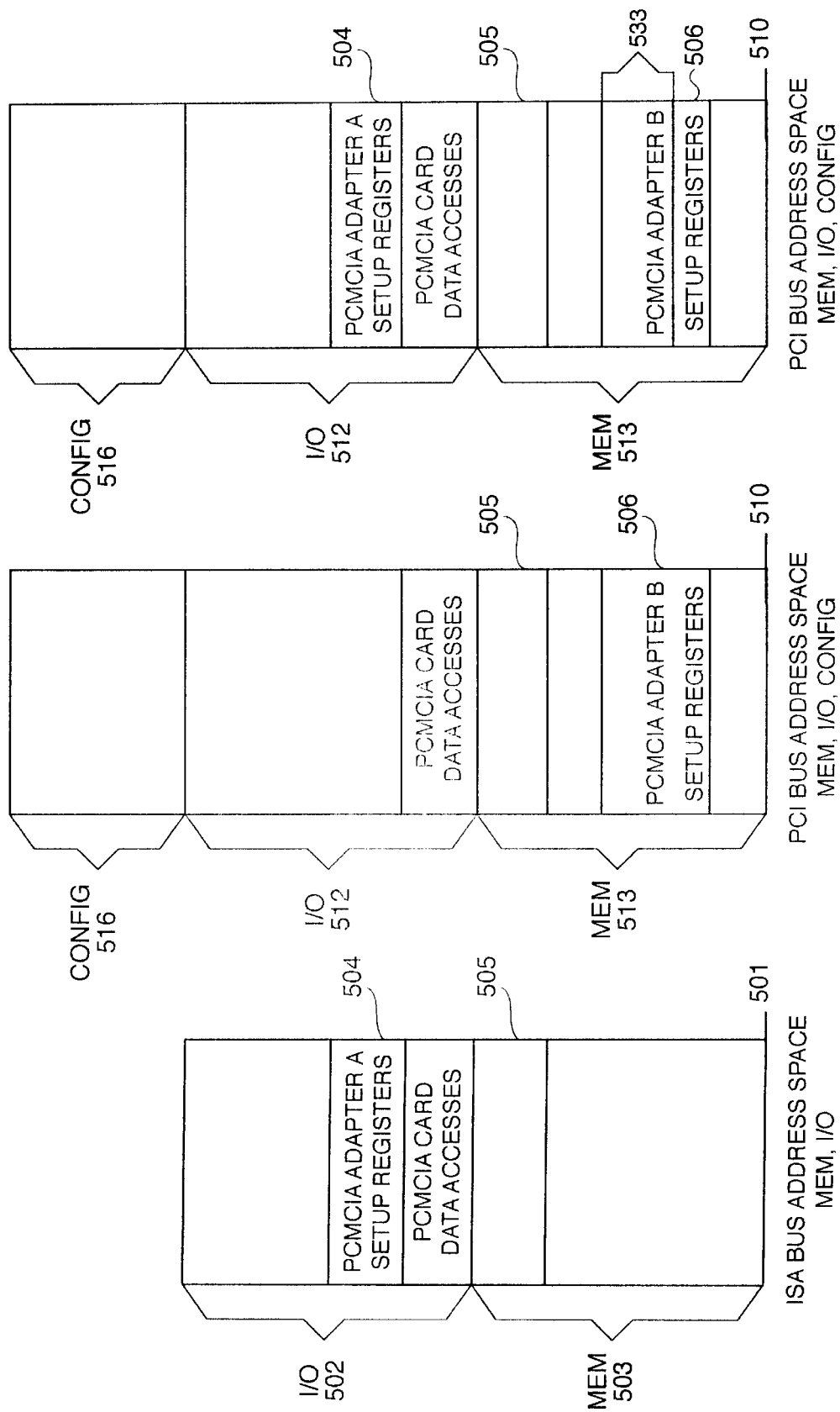
FIG. 5A illustrates the address range of the registers of the A register set.
FIG. 5B illustrates the address range of the registers of the B register set.
FIG. 5C illustrates the address ranges of the registers of the A and B register sets.

In the previous embodiment, PCMCIA adapter B 308, a mode select bit within a register was set to distinguish between using the A or B register set. In the preferred embodiment it is preferable to use address mapping techniques to transparently and automatically provide compatibility with previous versions of software. Referring to FIG. 5A, the ISA bus has an address space that consists of an I/O address space 502 and a memory address space 503. PCMCIA host adapter A used software and hardware that utilized a portion 504 of the I/O address space 502 for its register set. The ISA bus signals IOW/IOR indicate accesses into the I/O address space while the ISA bus signals MEMW/MEMR indicate accesses into the memory address space. Associated with the PCI bus is an I/O address space 512, memory address space 513, and a configuration address space 516 as illustrated in FIGS. 5B–5C. The PCI bus signals C/BE3#–C/BE0# as illustrated by Table 1 below indicate if any address space is being accessed or not.

TABLE 1

| PCI Command Types | | | | |
|---|---|---|---|---|
| C/BE3# | C/BE2# | C/BE1# | C/BE0# | COMMAND TYPE |
| 0 | 0 | 0 | 0 | Interrupt Acknowledge |
| 0 | 0 | 0 | 1 | Special Cycle |
| 0 | 0 | 1 | 0 | I/O Read |
| 0 | 0 | 1 | 1 | I/O Write |
| 0 | 1 | 0 | 0 | Reserved |
| 0 | 1 | 0 | 1 | Reserved |
| 0 | 1 | 1 | 0 | Memory Read |
| 0 | 1 | 1 | 1 | Memory Write |
| 1 | 0 | 0 | 0 | Reserved |
| 1 | 0 | 0 | 1 | Reserved |
| 1 | 0 | 1 | 0 | Configuration Read |
| 1 | 0 | 1 | 1 | Configuration Write |
| 1 | 1 | 0 | 0 | Memory Read Multiple |
| 1 | 1 | 0 | 1 | Dual-Address Cycle |
| 1 | 1 | 1 | 0 | Memory Read Line |
| 1 | 1 | 1 | 1 | Memory Write and Invalidate |

PCMCIA host adapter B physically has its register set mapped within a portion 506 of the memory address space 513. It is desirable to utilize software written for the PCMCIA host adapter A while using the improved PCMCIA host adapter B having its register set within the memory address space 513. Thus non-native register accesses to the PCMCIA host adapter A registers can be adapted into accesses of the PCMCIA host adapter B registers such as illustrated within the portion 533 of the memory address space 513 of FIG. 5C. Thus with the ISA bus software written for the PCMCIA host adapter A which generated IOR/IOW signals when accessing the host adapter A registers now generates an I/O Read and I/O Write command that corresponds to 0010 and 0011 for the C/BE3#–C/BE0# signals for the PCI bus. The PCMCIA host adapter B recognizes this I/O Read and I/O Write command as host adapter A register accesses and properly converts these into host adapter B register accesses. Because the hardware design and the host adapter B registers and individual bits are significantly different from the host adapter A, additional compatibility steps performed by the compatibility engine may be required to perform non-native register accesses. Registers within the PCMCIA host adapter B are a superset of the registers within the PCMCIA host adapter A. In the preferred embodiment of the present invention, the registers within the register set 220 are eight bit registers and the registers within the register set 320 are thirty-two bit registers. Individual bits of a single PCMCIA host adapter A register may be placed in different host adapter B registers when using the previous version of software developed for the PCMCIA host adapter A. Registers within the PCMCIA host adapter B can be directly accessed through an access into the memory address space such as that portion 506 illustrated in FIG. 5B when using software specifically designed to do so. Otherwise the compatibility engine 422 translates a register access within the I/O address space into a memory address space access and maps data to or from the appropriate bits within the B register set 320 located at the memory space 533. If the circuit is designed to operate in additional environments, additional portions of memory can be reserved as appropriate.

COMPATIBILITY ENGINE

Figure 6:
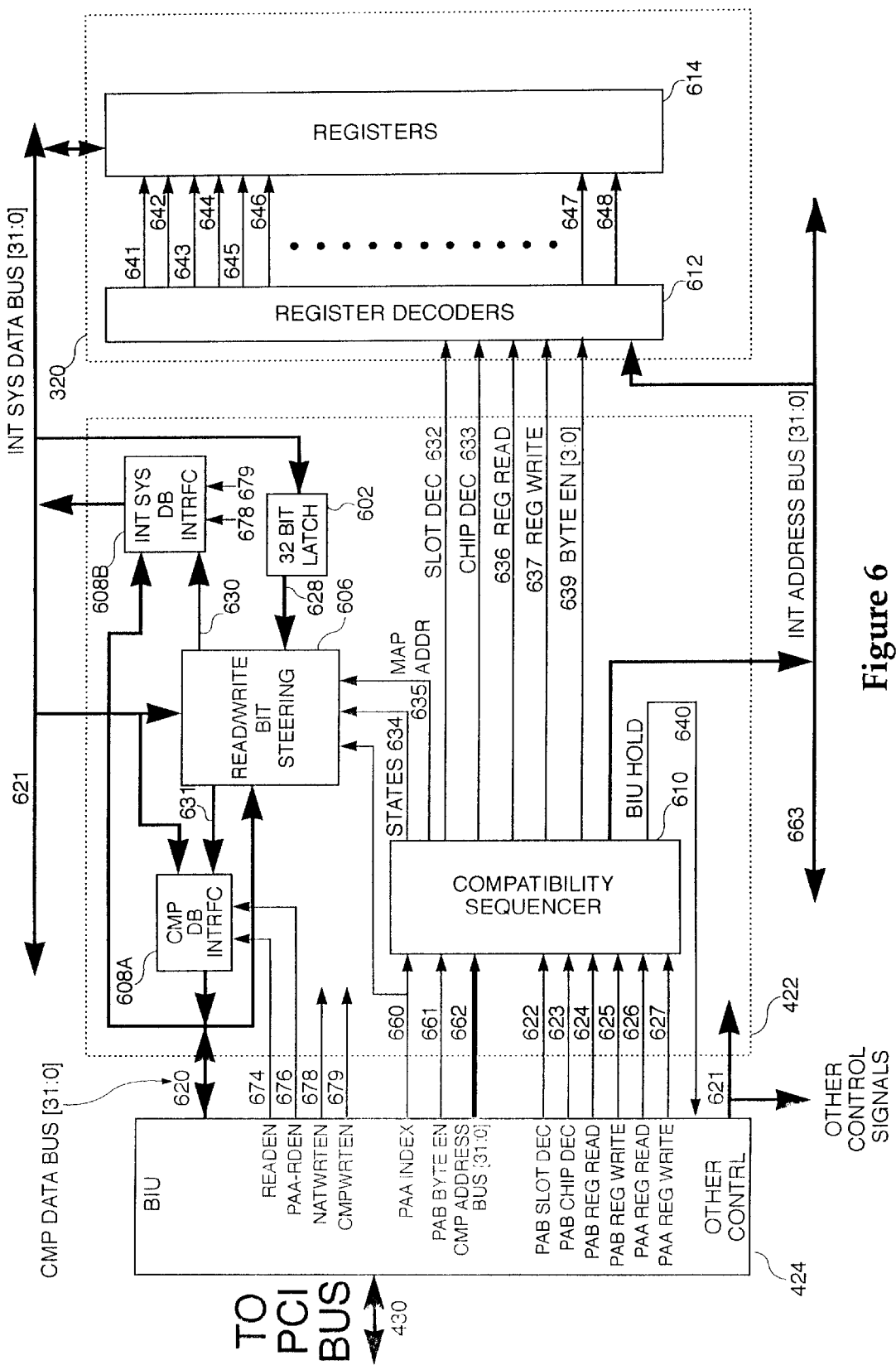
FIG. 6 illustrates a detailed block diagram of the compatibility engine and the B register set.

A block diagram of the compatibility engine 422 and the B register set 320 is illustrated in FIG. 6. Within the compatibility engine 422, the compatibility sequencer 610 is coupled to the read/write bit steering circuit 606 by the states signal bus 634 and the map address bus 635. The read/write bit steering circuit 606 is coupled to the compatibility data bus interface circuit 608A by the read data signal bus 631. The read/write bit steering circuit 606 is also coupled to the internal system data bus interface circuit 608B by the write data signal bus 630. The read/write bit steering circuit 606 is further coupled to the thirty-two bit latch 602 by the latch output bus 628.

The compatibility sequencer 610 is also coupled to the bus interface unit 424 by the signal lines 622–627 and 660–662. The compatibility sequencer 610 is also coupled to the register decoder circuits 612 by the signal lines 632, 633, 636, 637, and 639. The compatibility sequencer 610 is further coupled to the bus interface unit 424 by the biu-hold signal line 640. The compatibility sequencer 610 is further coupled to the internal address bus 663. The read/write bit steering circuit 606 is coupled to the bus interface unit 424 by the compatibility data bus 620 and the PAA INDEX 660. The read/write bit steering circuit 606 is also coupled to the internal system bus 621.

The compatibility data bus interface circuit 608A is coupled to the bus interface unit 424 and to the internal system data bus 621. The internal system data bus interface circuit 608B is also coupled to the bus interface unit 424 and to the internal system data bus 621. The thirty-two bit latch 602 is also coupled to the internal system data bus 621.

For reasons of simplicity the B register set 320 is illustrated as being centrally located but in reality the individual registers and associated register decoders are located in differing locations throughout the integrated circuit. The register decoders 612 are coupled to the registers 614 by the select lines 641–648. The register decoders 612 are also coupled to the internal address bus 663 and additional control and timing signals. The register decoders function to appropriately enable and disable each individual register to read or write data onto the internal system data bus 621. Thus the registers 614 are coupled to the internal system data bus 621.

The thirty-two bit latch 602 is used to latch data off of the internal system data bus 621. The read/write bit steering circuit 606 is used to map the data bits which the system is trying to write into an A register set 220, into the appropriate locations of the B register set 320 and read the appropriate bits out of the B register set 320 and compile them into the correct data to be written back into the PAB register. The compatibility sequencer 610 controls the operation of the circuits within the compatibility engine 422 and the operation of the B register set 320.

Figure 7A:
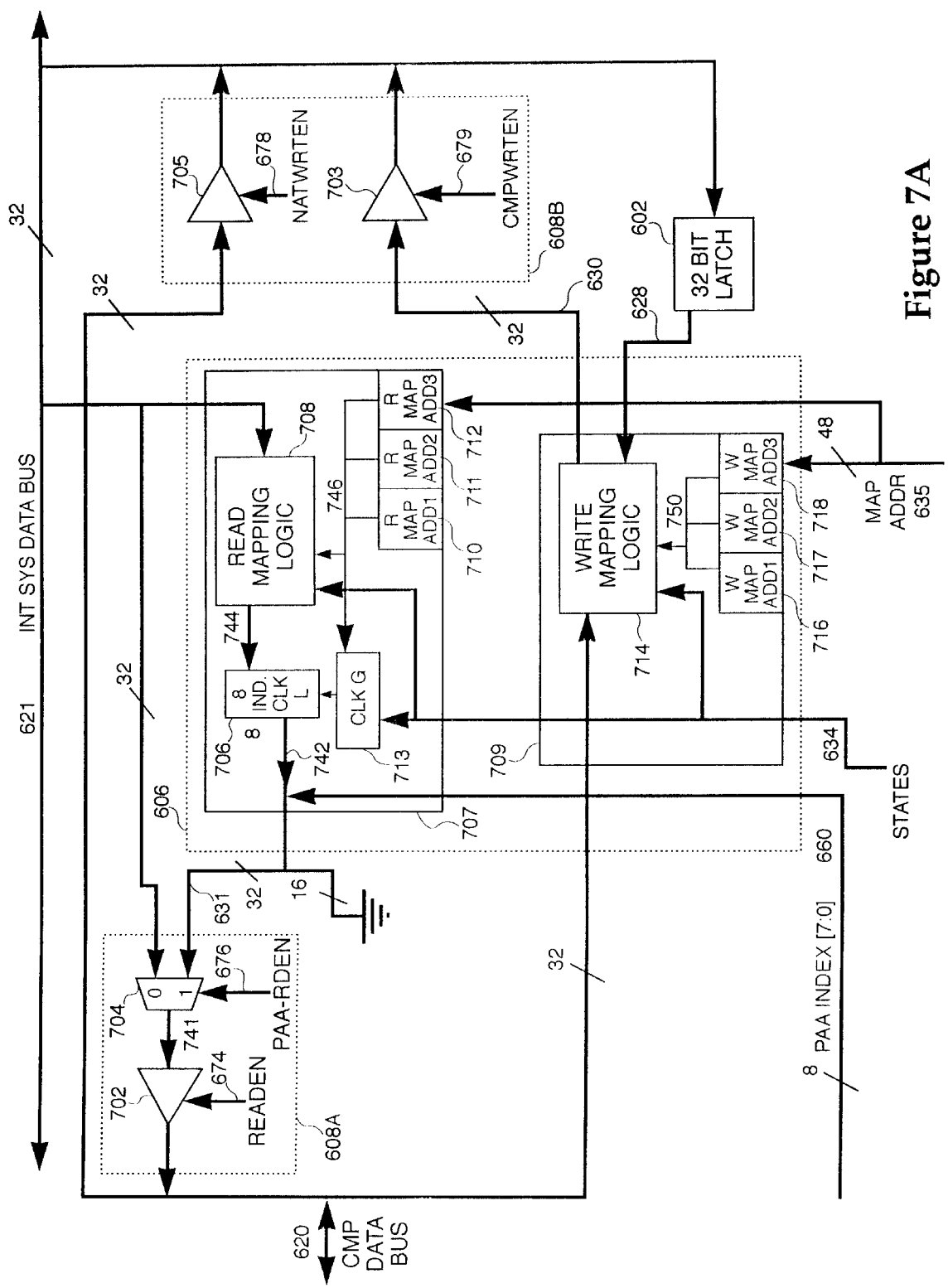
FIGS. 7A and 7B illustrate a detailed block diagram of the components within the compatibility engine.
Figure 7B:
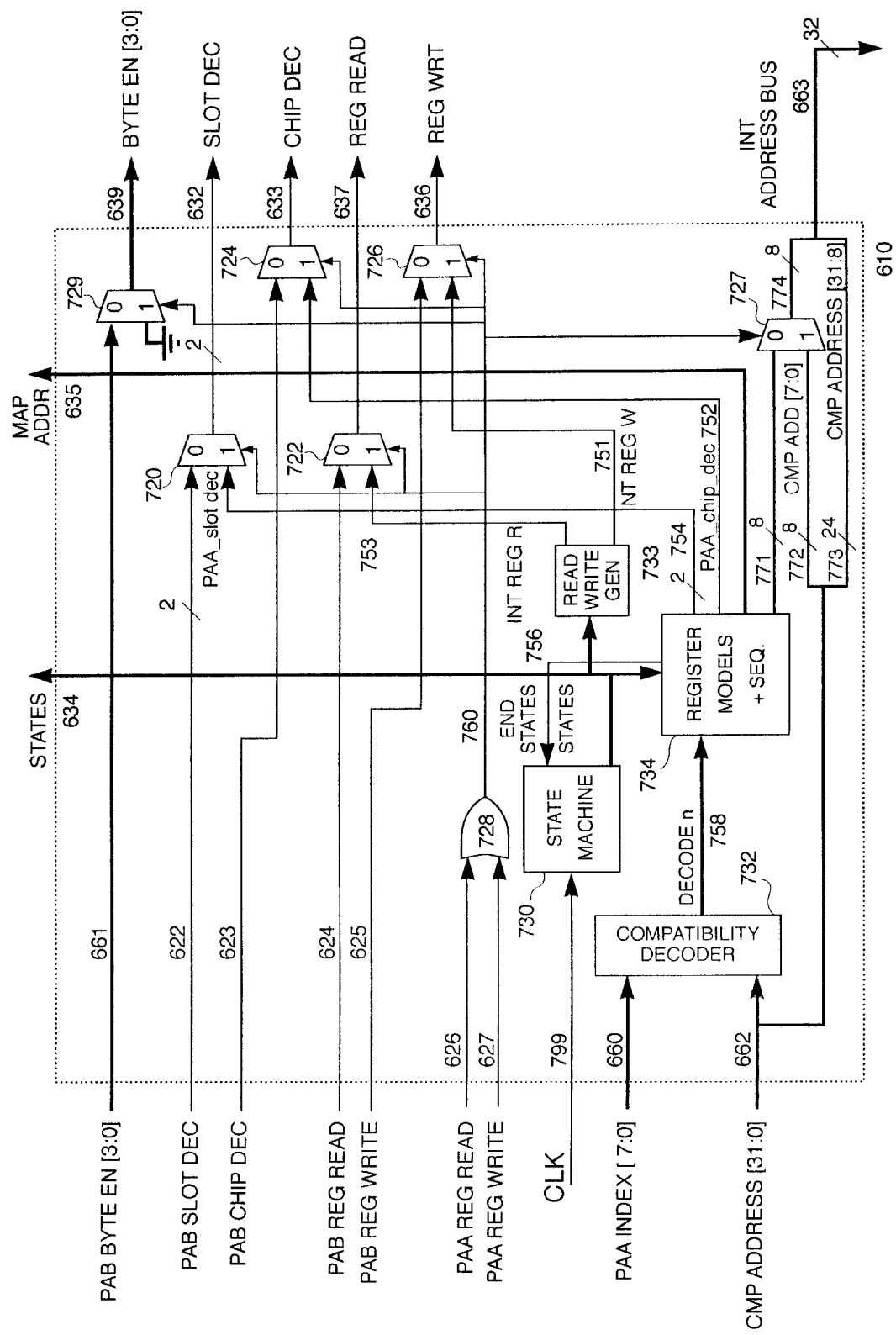

FIGS. 7A and 7B illustrate detailed block diagrams of the components within the compatibility engine 422. Within the compatibility data bus interface circuit 608A the multiplexer 704 is coupled to the tri-state driver 702 by the signal bus 741. The multiplexer 704 is coupled to the PCMCIA host adapter A read enable (PAA-RDEN) signal line 676 which is from the bus interface unit 424. The multiplexer 704 is also coupled to the internal system data bus 621 and to read data signal bus 631. The read data signal bus 631 is a 32 bit bus having bits 31–0 and merging various signal types. The PAA INDEX[7:0] 660 is placed onto bits 7–0 of bus 631. The 8 bit output of the independent eight bit clock latch 706 is placed onto bits 15–8 of read data signal bus 631. A logic level zero or ground is placed on bits 31–16 of read data signal bus 631. In the PCMCIA host adapter A the registers are selected for read or write by the index register. This index register is coupled to the index bus so that CPU reads and writes to the PCMCIA host adapter A, uses this index register to point to the desired PCMCIA host adapter A register. In the existing PCMCIA host adapter A, the index register resides in the CPU I/O address space, commonly at address 03E0h and the rest of the registers appear at address 03E1h at the direction of the index register. Thus the index address may be provided to the bus interface unit with the associated data from the appropriate register as necessary. The tri-state driver 702 is coupled to the bus interface unit and controlled by the read enable (READEN) signal line 674. The output of the tri-state driver 702 is coupled to the compatibility data bus 620.

When a non-native register read access is requested where the software attempts to read from a register within the A register set, the bus interface unit 424 preliminarily detects the non-native access and drives the PAA register read control signal line 626 so that it is set to a logical high voltage level indicating a non-native register read operation. PAA-RDEN 676 is driven to a logical high at the appropriate time such that data on the read data signal bus 631, including eight bits from the eight bit independently clocked latch 706, are passed through the multiplexer 704 and driven by tri-state driver 702 and output onto the compatibility data bus 620 when the READEN 674 signal is enabled. In the preferred embodiment, the native registers of the PCMCIA host adapter B are selected by the CPU address within the PCI memory space. Other embodiments could use I/O address space for both native and non-native accesses or memory address space for both types of access. When a native register read access is requested where the software attempts to read from a register within the B register set 320, the PAA register read control signal line 626 is set to a logical low voltage level indicating a native register read operation. PAA-RDEN 676 is driven to a logical low level such that data read from the registers 614 available on the internal system bus 621 is multiplexed onto bus 741 by the multiplexer 704 and driven onto the compatibility data bus 620 by the tri-state driver 702 when the READEN signal 674 is selected.

Within the internal system data bus interface circuit 608B the tri-state driver 705 is coupled to the compatibility data bus 620, the internal system data bus 621 and the bus interface unit 424 by the native write enable (NATWRTEN) signal line 678. the tri-state driver 703 is coupled to the write data signal bus 630, the internal system data bus 621, and the bus interface unit 424 by the compatible write enable (CMPWRTEN) signal line 679. Tri-state drivers 703 and 705 logically act similar to a multiplexer where either the data from the compatibility engine or the data from the compatibility bus is driven onto the internal system data bus 621. The tristate drivers are preferable in order to decrease the timing delays of the signals. In the case of a native register write operation the signal NATWRTEN 678 enables tristate driver 705 to drive data directly from the compatibility bus 621 onto the internal system data bus 621 bypassing the read/write bit steering circuit 606. In the case of a non-native register write operation the signal CMPWRTEN 679 enables the tri-state driver 703 to drive data from the read/write bit steering circuit 606 onto the internal system data bus 621. The write data signal bus 630 is output from the write mapping logic circuit 714 and is coupled to the input of the tri-state driver 703.

When a non-native register write access is requested where the software attempts to write to a register within the A register set, the bus interface unit 424 preliminarily detects the non-native access and drives the PAA register write control signal line 627 to a logical high voltage level indicating a non-native register write operation. Compatibility operations for a write operation consist of reading the target register, temporarily holding the contents of the target register in a latch, modifying certain bits of the output from the latch based on write map addresses and the data that was to be written into the PAA registers, and then finally writing the contents back into the target register. Data generated by the write mapping logic circuit 714 is output on the write data signal bus 630. Tristate driver 703 drives the data generated by the write mapping logic circuit 714 onto the internal system data bus 621 when the CMPWRTEN signal 679 is selected which then is subsequently written into the appropriate register.

When a native register write access is requested where the software attempts to write to a register within the B register set 320, the PAA register write control signal line 627 is set to a logical low voltage level indicating a native register write operation. Data to be written into a given register within the B register set flow from the compatibility data bus 620 and are driven by the tristate driver 705 onto the internal system bus 621 when the NATWRTEN signal 678 is selected which then is subsequently written into the appropriate native register.

Within the read/write bit steering circuit 606 the read mapping logic circuit 708 is coupled to the internal system bus 621, to the eight-bit independent clock latching circuit 706 and to the first, second and third read mapping address registers 710–712. The clock generating circuit 713 is coupled to the eight bit independent clock latching circuit 706 and to the first, second and third read mapping address registers 710–712. The states signal bus 634 from the state machine 730 is coupled as an input to the clock generating circuit 713, the read mapping logic circuit 708, the write mapping logic circuit 714, the internal read/write generator 733, and the register models and sequencer circuit 734. The clock generating circuit 713 generates 8 independent clock stimulus for the 8 bit individual clock latch 706 in response to the state number from the states signal bus 634 and the read map address contained in the first, second, or third read mapping address registers 710–712. The write mapping logic circuit 714 is also coupled to the compatibility data bus 620, the latch output bus 628 of the thirty-two bit latch 602 and the first, second and third write mapping address registers 716–718. The map address bus 635 from the register models and sequencer circuit 734 is coupled as an input to each of the first, second and third read mapping address registers 710–712 and the first, second and third write mapping address registers 716–718. The first, second and third read mapping address registers 710–712 and the first, second and third write mapping address registers 716–718 are appropriately clocked in order to capture read map address one, read map address two, read map address three, write map address one, write map address two, or write map address three from the 48 bit map address bus 635. The internal system data bus 621 is also coupled as an input to the thirty-two bit latch 602.

Referring to FIG. 7B the compatibility sequencer 610 has the PCMCIA host adapter A register index signal lines (PAA INDEX) 660 and the 32 bit compatibility address bus lines 662 coupled as inputs to the compatibility decoder circuit 732. The output decode n signal lines 758 of the compatibility decoder 732 is coupled as an input to the register models and sequencer circuit 734. The two bit PAA slot decoder signal lines 754 are coupled as an output from the register models and sequencer circuit 734 and as an input to the multiplexer 720. The PAA chip decoder signal line 752 is also coupled as an output from the register models and sequencer circuit 734 and as an input to the multiplexer 724. The internal address bus 663 is generated by combining 24 most significant bits 773 from the compatibility address bus 662 with the 8 bits that are provided by the output 774 from the multiplexer 727. Multiplexer 727 selects between the lower 8 bits 772 of the compatibility bus 662 or the register address signal bus 771 that is output from the register models and sequencer circuit 734. In the case of a native register access, signal line 760 is a logical zero such that the multiplexer 727 selects to output the lower 8 bits 772 from the compatibility bus. In the case of a non-native register access, signal line 760 is a logical one such that the muliplexer 727 selects to output the register address signal bus 771. For a non-native register access the addresses into the B register set is generated by the register models and sequencer circuit 734. In the present invention the 24 most significant bits of the internal address bus are not used by the register decoders 612. However it should be obvious to one skilled in the art of how to generate and mulitplex the higher order bits in order to address a register set having more registers than the present invention. The end states signal line 756 is coupled as an output from the register models and sequencer circuit 734 and as an input to the state machine 730. A clock signal 799 is coupled as an input to control the operation of the state machine 730 and is also coupled to nearly all other blocks but is not illustrated as such for reasons of clarity.

PCMCIA host adapter B byte enable signal bus (PAB BYTE EN) 661 is coupled to the input of multiplexer 729. Logical zero or ground is also coupled to an input of multiplexer 729. The output of multiplexer 729, byte enable signal bus 639, is coupled to the register decoders 612. The byte enable signal indicates which of the four 8 bit bytes contained within the 32 bit wide registers of the B register set is to be read or written. This function provides compatibility for software programs that were written to support the ISA system bus. The byte enable signal is an active low signal such that if the byte enable signal is set to all zeroes (0000) then all 4 bytes of the 32 bit register are to be written or read. In the case of a non-native register access all 4 bytes of the 32 bit register are required within the compatibility engine. In the case of a non-native register access, output signal line 760 is a logical one such that multiplexer 729 selects ground to be output onto all bits of the byte enable signal bus 639. In the case of a native register access, output signal line 760 is a logical zero such that multiplexer 729 selects to output PAB BYTE EN 661 onto the byte enable signal bus 639.

The internal register read signal line 753 is coupled as an output from the internal read/write generator circuit 733 and as an input to the multiplexer 722. The internal register write signal line 751 is coupled as an output from the read/write generator circuit 733 and as an input to the multiplexer 726. The two bit PCMCIA host adapter B slot decoder signal lines 622 are coupled as an input to the multiplexer 720. The output of the multiplexer 720 is coupled to the slot decoder signal lines 632. The PCMCIA host adapter B (PAB) chip decoder signal line 623 is coupled as an input to the multiplexer 724. The output of the multiplexer 724 is coupled to the chip decoder signal line 633. The PCMCIA host adapter B (PAB) register read signal line 624 is coupled as an input to the multiplexer 722. The output of the multiplexer 722 is coupled to the register read signal line 637. The PCMCIA host adapter B (PAB) register write signal line 625 is coupled as an input to the multiplexer 726. The output of the multiplexer 726 is coupled to the register write signal line 636. The PCMCIA host adapter A (PAA) register read and write signal lines 626 and 627 are both coupled as inputs to the OR-gate 728. The output of the OR-gate 728 is coupled to control the multiplexers 720, 722, 724 and 726.

The PCMCIA expansion slot 106, referred to as slot A, has SLOT A registers within both the A register set 220 and the B register set 320 of the respective PCMCIA host adapter which are allocated to it specifically. The PCMCIA expansion slot 107, referred to as slot B, has SLOT B registers within both the A register set 220 and the B register set 320 of the respective PCMCIA host adapter which are allocated to it specifically. Existent within the A register set 220 and the B register set 320 of the respective PCMCIA host adapter are registers that are common to both slot A 106 and slot B 107 which are referred to as the CHIP registers. The slot decode signal lines 632 and the chip decode signal line 633 are used to signal which of the register blocks are being accessed. The SLOT A registers will be accessed when the slot decode signal lines 632 are equal to "01" and the chip decode signal line 633 is at a logical low voltage level. The SLOT B registers will be accessed when the slot decode signal lines 632 are equal to a "10" and the chip decode signal line 633 is at a logical low voltage level. The CHIP registers will be accessed when the slot decode signal lines 632 are equal to a "00" and the chip decode signal line 633 is at a logical high voltage level.

When either of the PCMCIA host adapter A (PAA) register read or register write signal lines 626 or 627 are at a logical high voltage level the multiplexers 720, 724, 722 and 726 will pass through the PCMCIA host adapter A (PAA) signals 754, 752, 753 and 751 to the signals 632, 633, 637 and 636, respectively. When neither of the PCMCIA host adapter A (PAA) register read or register write signal lines 626 or 627 are at a logical high voltage level the multiplexers 720, 724, 722 and 726 will pass through the PCMCIA host adapter B (PAB) signals 622, 623, 624 and 625 to the signal lines 632, 633, 637 and 636, respectively. The register read signal line 637 signals that the system is reading from the registers. The register write signal line 636 signals that the system is writing to the registers. In this manner the compatibility sequencer provides the proper signalling for register accesses into the native B register set 320 within the PCMCIA host adapter B 408 when either a native register access for the PCMCIA host adapter B register set 320 is requested or a non-native register access request for the PCMCIA host adapter A register set 220.

Figure 8:
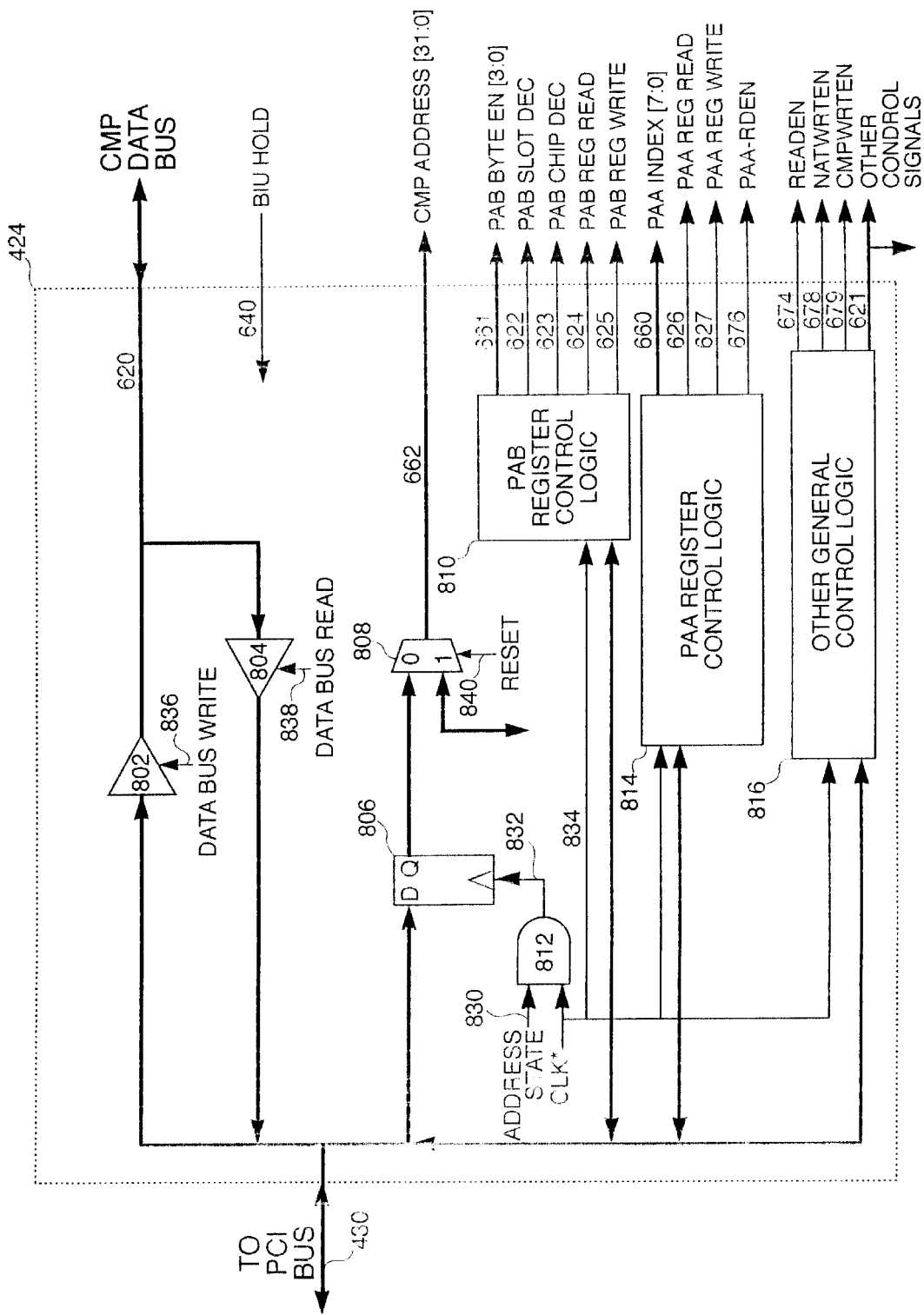
FIG. 8 illustrates a block diagram of the bus interface unit.

A detailed block diagram of the bus interface unit 424 is illustrated in FIG. 8 that interfaces the compatibility data bus 620 and the compatibility address bus 662 with the PCI system bus 312 as well as generates register and other control signals for system containing the present invention. Within the bus interface unit 424 the PCMCIA host adapter A register control logic circuit 814 is coupled to the system bus 312 and to the clock signal CLK*. The PCMCIA host adapter B register control logic circuit 810 is coupled to the PCI system bus 312 and to the clock signal CLK*. The other general control logic circuit 816 is also coupled to the PCI system bus 312 and to the clock signal CLK*. The clock signal CLK* is further coupled as an input to the AND gate 812. The address state signal line 830 is also coupled as an input to the AND gate 812. The BIU HOLD signal line 640 from the compatibility sequencer 610 is coupled to nearly all blocks within the bus interface unit in order to accomplish the number of cycles necessary to complete a compatibility operation that may be required by a non-native register access. Simply put the bus interface holds the present state of it address and control signals and refuses to accept any new commands until the present operation is completed.

The PCI system bus 312 is coupled as the input to the register 806. The output of the register 806 is coupled as an input to the multiplexer 808. The output 832 of the AND gate 812 is coupled as the controlling input of the register 806. The other input of the multiplexer 808 is coupled to ground. A reset signal line 840 is coupled to control the operation of the multiplexer 808. The compatibility address bus 662 output from the multiplexer 808 is coupled to the compatibility sequencer 610 for transmitting a thirty-two bit address.

The PCMCIA host adapter A (PAA) index signal lines 660, the PCMCIA host adapter A (PAA) register read signal line 626, and the PCMCIA host adapter A (PAA) register write signal line 627 are all output from the PCMCIA host adapter A (PAA) register control logic circuit 814 and coupled as inputs to the compatibility sequencer 610. The PCMCIA host adapter A read enable signal line (PAA-RDEN) 676 is output from the PCMCIA host adapter A (PAA) register control logic circuit 814 and coupled as an input to the compatibility data bus interface circuit 608A. The PCMCIA host adapter B (PAB) byte enable signal lines 661, the PCMCIA host adapter B (PAB) slot decoder signal lines 622, the PCMCIA host adapter B (PAB) chip decoder signal line 623, the PCMCIA host adapter B (PAB) register read signal line 624 and the PCMCIA host adapter B (PAB) register write signal line 625 are all output from the PCMCIA host adapter B (PAB) register control logic circuit 810 and coupled as inputs to the compatibility sequencer 610. The control signal lines 621 are output from the other general control logic circuit 816 and coupled as inputs to the compatibility sequencer 610 and other logic circuits that are within the integrated circuit containing the present invention. The signals compatibility write enable (CMPWRTEN) 679, native write enable (NATWRTEN) 678, and read enable (READEN) 674, are generated at appropriate times by the other general control logic circuit 816. The PCMCIA host adapter A read enable (PAA-RDEN) 676 is generated at appropriate time by the PAA register control logic circuit 814. The signals CMPWRTEN 679 and NATWRTEN 678 are coupled to the internal system data bus interface circuit 608B. The signals READEN 674 and PAA-RDEN 676 are coupled to the compatibility data bus interface circuit 608A.

Tri-state drivers 802 and 804 provide a bidirectional transfer of data between the data signals lines of the PCI system bus 312 and the compatibility bus 620. The compatibility data bus 620 is coupled as an input to the tri-state driver 804. The output of the tri-state driver 804 is coupled to the PCI system bus 312. The data bus read signal line 838 is coupled to control the tri-state driver 804. The PCI system bus 312 is coupled as an input to the tri-state driver 802. The output of the tri-state driver 802 is coupled to the compatibility data bus 620. The data bus write signal line 836 is coupled to control the tri-state driver 802.

As stated above with regards to the preferred embodiment of the present invention, the native registers within the PCMCIA host adapter B, referred to as the B register set 320, are thirty-two bit registers whereas the native registers within the PCMCIA host adapter A, referred to as the A register set 220, are 8 bit registers. Because the hardware design of the PCMCIA host adapter B is different from the hardware design of the PCMCIA host adapter A, placement of individual bits within a register to control, monitor, or perform another functions for the different hardware designs may be in differing registers as well as bit locations. Thus the bits representing a register in the A register set 220 may be spread across two or more registers within the B register set 320. In other words there may be no direct correspondence between the registers in the A register set 220 and the registers in the B register set 320. Therefore, the mapping of the registers within the A register set 220 to the registers within the B register set 320 needs to be performed bit by bit so that a register from the A register set 220 may be mapped into multiple registers within the B register set 320 as illustrated in the FIG. 9A. Of course integrated circuits could be designed to have corresponding register sets. However, the enhancements offered by the new B register set would be lost and the design for the improvements in hardware would be more difficult and require more silicon area increasing the cost.

MAPPING

Figure 9A:
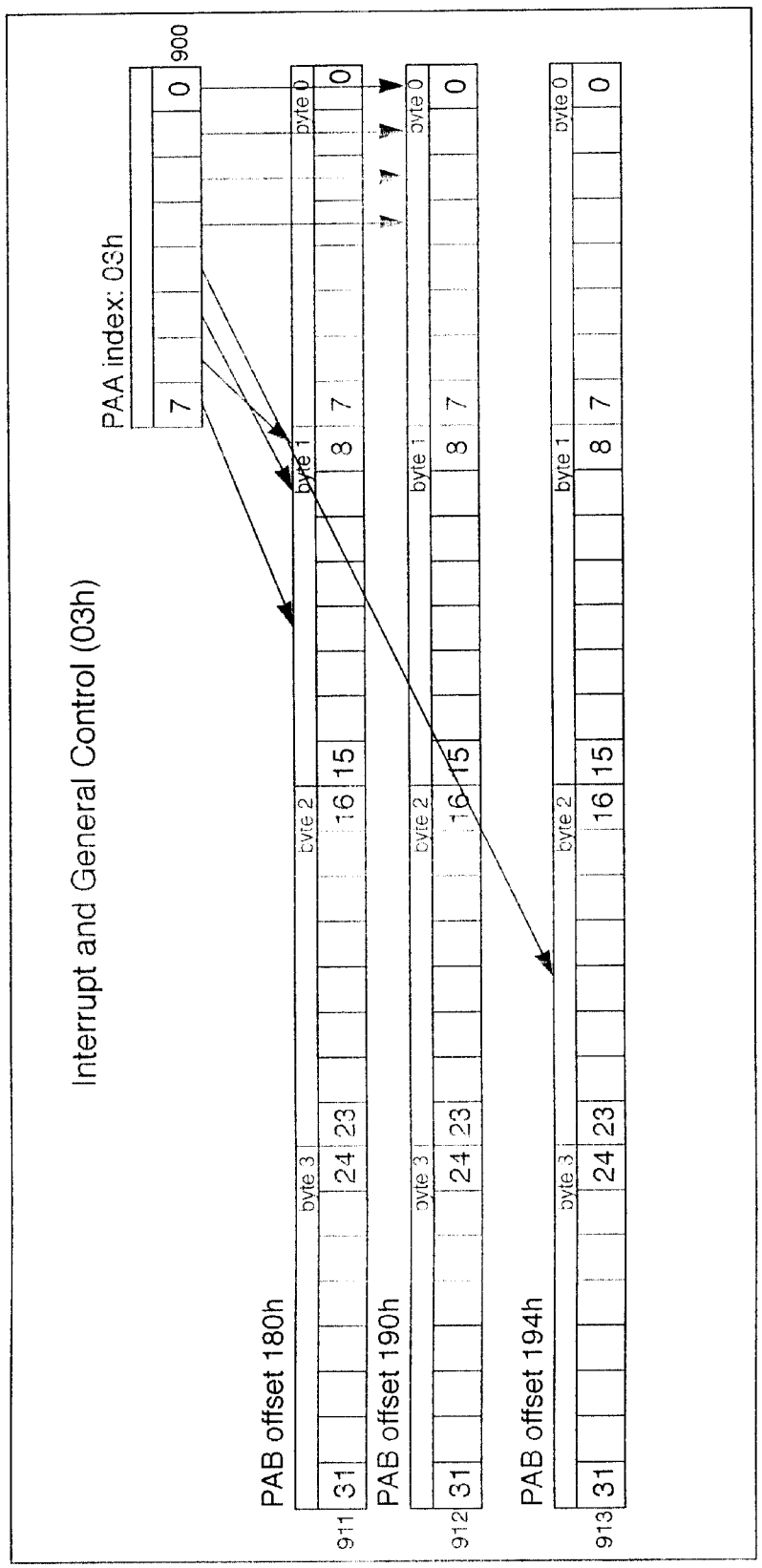
FIGS. 9A–9F illustrate the mapping schemes for selected registers within the A register set.

FIGS. 9A–9E illustrate examples of the various type of register bit mappings that occur within the compatibility engine. FIG. 9A illustrates a one to one mapping of the bits of a byte wide register within the A register set 220 into three different registers within the B register set 320 for the integrated circuits of the preferred embodiment. The eight bit register 900 having an index address of 03h is mapped into bits within the three thirty-two bit registers 911–913 having offset addresses 180h, 190h and 194h. An index address refers to a non-native register address and an offset address refers to a native register address. As illustrated by FIG. 9A the three most significant bits, bit 7, 6 and 5 of the register 900 of the A register set are mapped to bits 12, 8 and 9 of the register 911 of the B register set, respectively. Bit 4 of the register 900 is mapped to Bit 20 of the register 913 of the B register set. Bits 3, 2, 1 and 0 of the register 900 are mapped to bits 3, 2, 1 and 0 of the register 912 of the B register set, respectively. FIG. 10A illustrates the three write map addresses 1001–1003 to accomplish this mapping during a write operation.

When the system tries to write into the register 900, the compatibility sequencer 610 recognizes this address as a non-native register access having an address corresponding to the A register set 220. The compatibility sequencer 610 and the read/write bit steering circuit 606 then work in conjunction with the register decode circuit 612 to write the data into the specific bits of the three registers 911–913 within the B register set 614. The compatibility decoder circuit 732 initiates the mapping sequence and activates the appropriate one of the decode n signal lines 758. Each register within the A register set 220 has a corresponding signal line within the decode n signal lines 758. When the register models and sequencer circuit 734 receives the input of the decode n signal lines 758, the appropriate template for mapping the bits of the register is retrieved. This template can be stored in memory or logic. Templates may be categorized into four groups. The first group of templates is for registers having a one to one mapping which are mapped only to one register. The second group of templates is for registers having a one to two mapping which are mapped into two registers. The third group of templates is for registers having a one to three mapping which are mapped into three registers. The fourth group of templates is for special cases. An example of a special case is where a logical operation is performed on the bits in order to map appropriately into the register. It should be obvious that other groups of templates may be created for other types of mapping such as one to four or other combinations.

Once the template has been retrieved, the register models and sequence circuit 734 then outputs the read or write map address, on the map address bus 635, to the first, second and third read mapping address registers 710–712 or the first, second and third write mapping address registers 716–718. While providing the read or write mapping addresses, the addresses of the registers within the B register set 320 which are to be accessed are output by the register models and sequence circuit 734 onto the internal address bus 663.

In the preferred embodiment of the present invention the registers within the B register set 614 are parallel registers and therefore all of the bits within a register must be input or output simultaneously. Therefore, when one or more bits within a register are to be changed, the register is first read and the information from the register is stored in the thirty-two bit latch 602. Specific bits stored within the thirty-two bit latch 602 may be changed within the write mapping logic circuit 714 in response to a write map address and external data representing the selected register of the A register set that is available on the compatibility data bus 620. Other bits within the thirty-two bit latch 602 remain unchanged passing through the write mapping logic circuit 714. The changed and unchanged bits from the operation of the write mapping logic circuit 714 pass through the system bus interface circuit 608B to the internal system data bus 621 and are written back into the appropriate register within the B register set 614. If the bits from one register are mapped into multiple registers as illustrated in FIG. 9A, then this process must be done for each register into which specific bits are to be written. For each register which must be written to, the state machine must complete two states. In the first state the register is read and the contents of the register are then written to the thirty-two bit latch 602. In the second state the appropriate bits are changed while other remain unchanged by the write mapping logic circuit and written back to the appropriate one of the registers within the B register set 614.

Alternatively, the registers of the B register set 614 could be implemented as bit-enabled registers that have each bit within the register individually clocked or enabled so that only the required bits which are mapped need to be written to or read from, without requiring a thirty-two bit latch.

When the system tries to read from the register 900, the compatibility sequencer 610 recognizes this address as a non-native register access having an address corresponding to the A register set 220. The compatibility sequencer 610 and the read/write bit steering circuit 606 then work in conjunction with the register decode circuit 612 to read data from the three registers 911–913 within the B register set 614 having specific data bits that may be mapped into an equivalent register within the A register set 220. The compatibility decoder 732 initiates the mapping sequence and activates the appropriate one of the decode n signal lines 758 and the register models and sequencer circuit 734 retrieves the corresponding template for the requested non-native register access. Three read map addresses are then loaded into the read mapping address registers 710–712, respectively. The offset register addresses 180h, 190h and 194h representing the registers 911–913 are sequentially output onto the internal address bus 663. The read mapping logic circuit 708 then reads the address from the first read mapping address register 710 and retrieves the data stored in the register 911. As illustrated by the read map address 1031 in FIG. 10B, bits 12, 8 and 9 of the register 911 are then loaded into bits 7, 6 and 5 of the eight bit independent clocking latch 706. The read mapping logic circuit 708 next reads the address from the second read mapping address register 711 and retrieves the data stored in the register 912. As illustrated by the read map address 1032 in FIG. 10B, bits 0–3 of the register 912 are then loaded into bits 0–3 of the eight bit independent clocking latch 706. The read mapping logic circuit 708 then reads the address from the third read mapping address register 712 and retrieves the data stored in the register 913. As illustrated by the read map address 1033 in FIG. 10B, bit 20 of the register 913 is then loaded into bit 4 of the eight bit independent clocking latch 706. To complete the read operation, the contents of the eight bit independent clocking latch 706 are output through the compatibility data bus interface circuit 608B onto the compatibility data bus 620. The eight bit independent clocking latch 706 consists of eight single bit latches having an independent enable control such that any single latch or any plurality of latches can be enabled at a given moment.

Figure 9B:
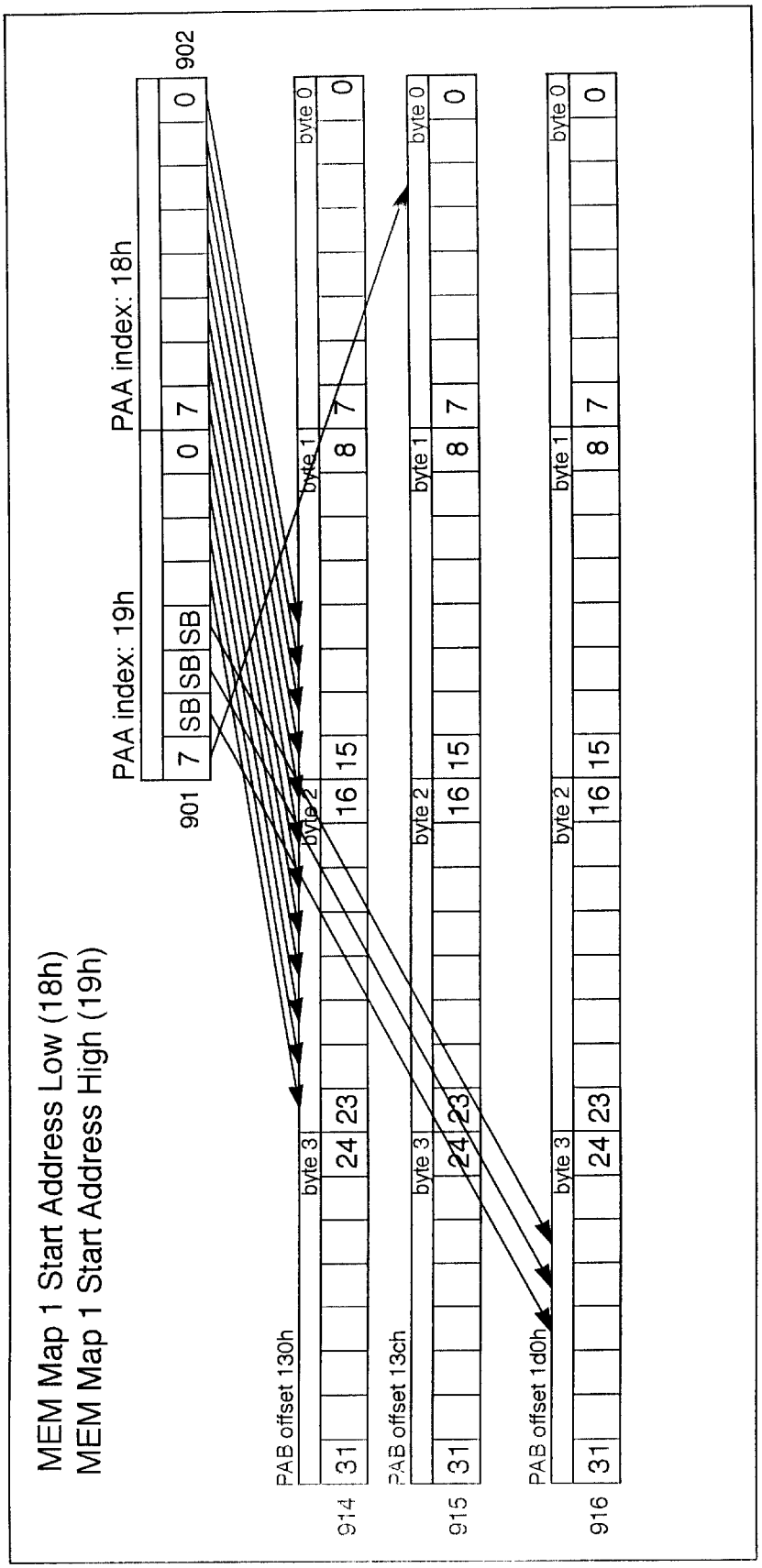
Figure 10A:
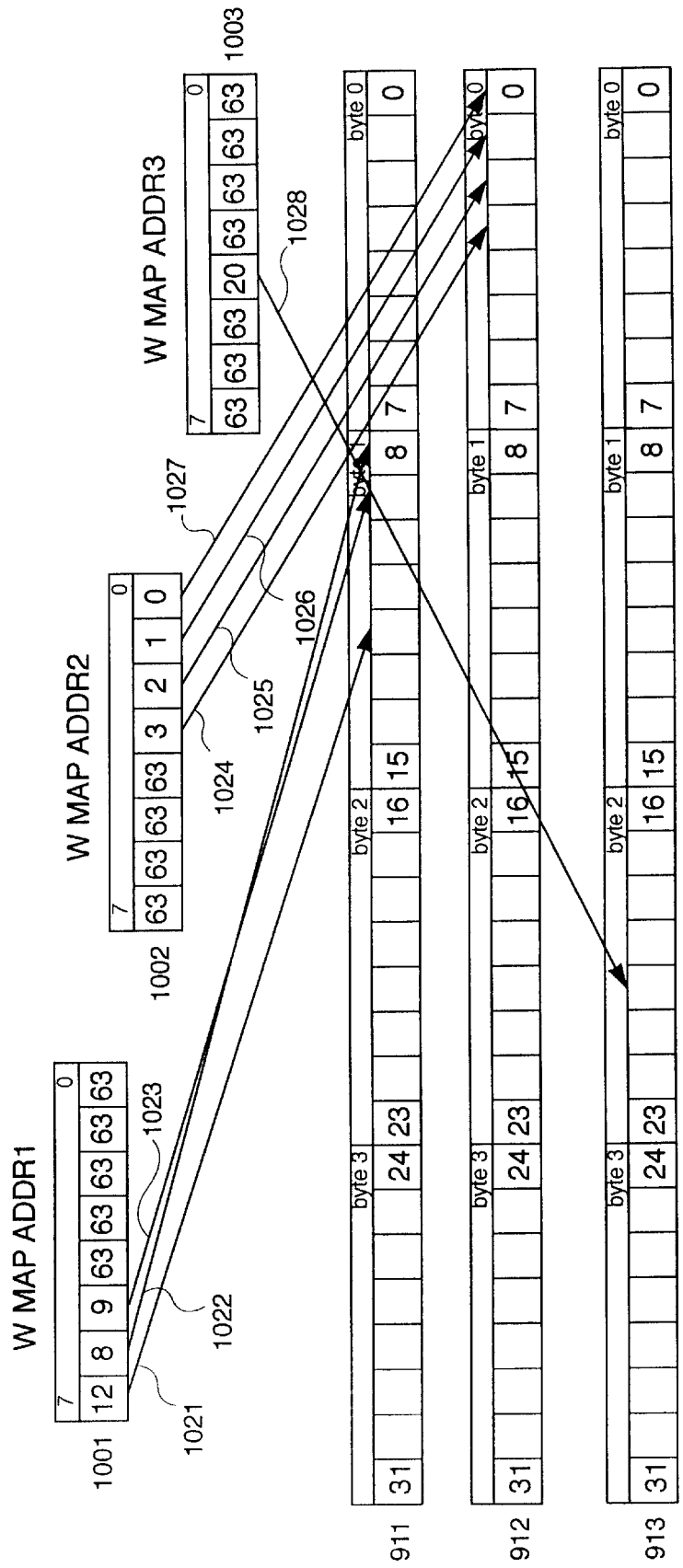
FIG. 10A illustrates the mapping function for a write operation to a register within the A register set.

FIG. 9B illustrates a one to three mapping of the bits of a two-byte register within the A register set 220 into three different registers within the B register set 320. The two eight bit registers 901 and 902 having index addresses of 19h and 18h are mapped into bits within the three thirty-two bit registers 914, 915 and 916 having offset addresses of 130h, 13ch and 1d0h. Bits 0 through 7 of the register 902 are mapped into bits 12 through 19, respectively, of the register 914. Bits 0 through 3 of the register 901 are mapped into the bits 20 through 23, respectively, of the register 914. Bits 4 through 6 of the register 901 are general purpose scratch bits and are mapped into bits 26 through 28, respectively, of the register 916. Bit 7 of the register 901 is mapped into bit 2 of the register 915. General purpose scratch bits act as storage such as memory that may be used with software.

Figure 9C:
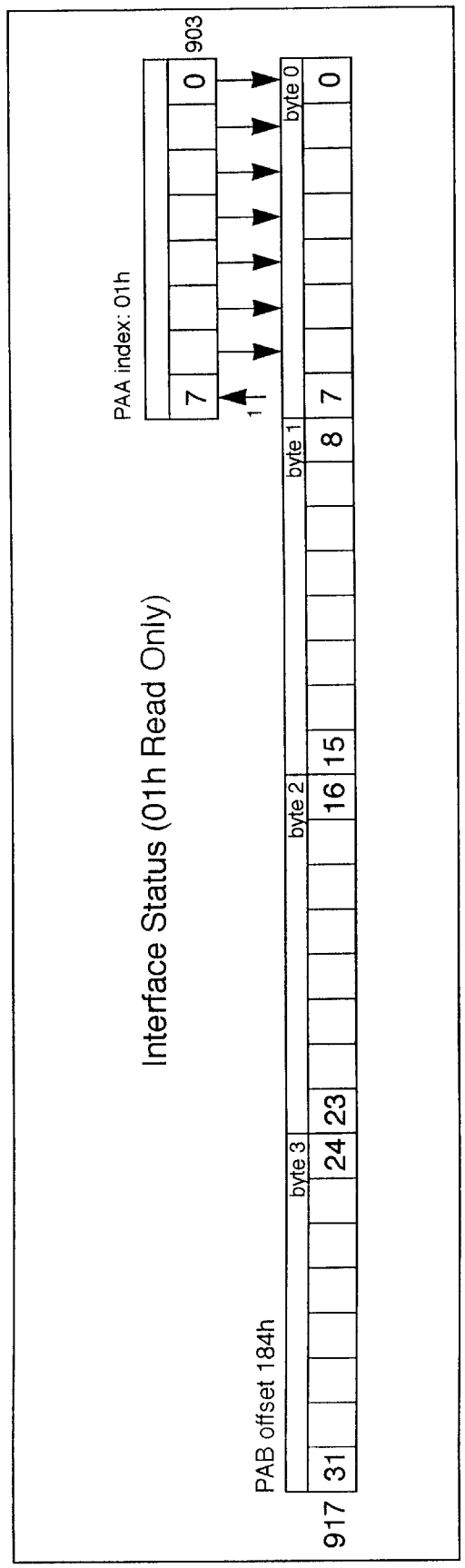

FIG. 9C illustrates a one to one mapping where the bits of a read only register within the A register set 220 are mapped into only one register within the B register set 320. The eight bit register 903 having an index address of 01h is mapped into bits within the thirty-two bit register 917 having an offset address 184h. The most significant bit, bit 7, of the register 903 is forced always to remain at a logical high voltage level. The bits 0 through 6 of the register 903 are mapped into the bits 0 through 6 of the register 917.

Figure 9D:
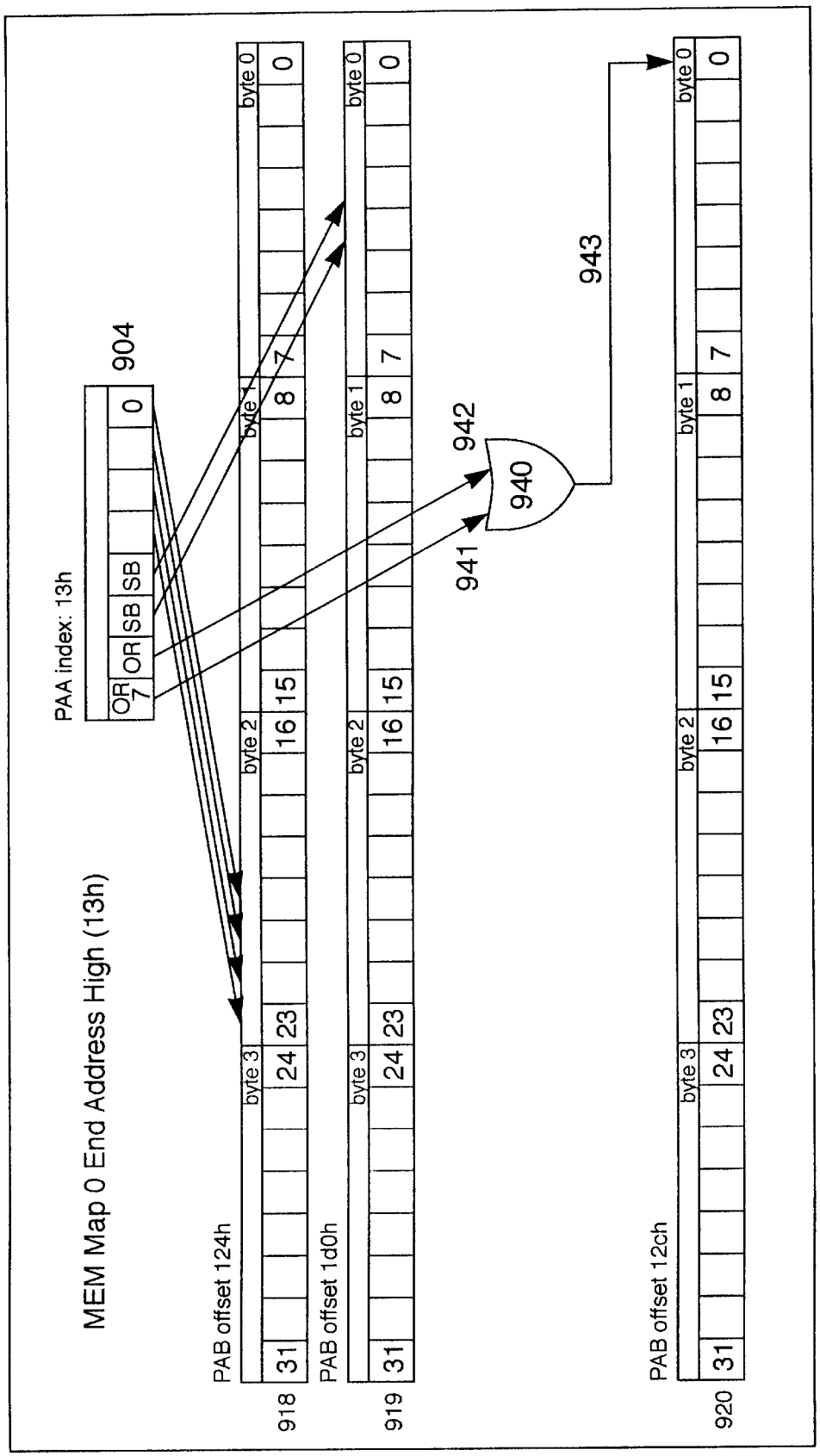

FIG. 9D illustrates a special case mapping where the bits of one eight bit register within the A register set 220 are mapped into three different registers within the B register set 320 where it is necessary for a logic function to be performed in order to determine what is to be stored. The eight bit register 904 having an index address of 13h is mapped into bits within the three thirty-two bit registers 918, 919 and 920 having offset addresses of 124h, 1d0h and 12ch respectively. Bits 0 through 3 of the register 904 are respectively mapped into bits 20–23 of the register 918. Bits 4 and 5 of the register 904 are general purpose scratch bits and are mapped into the bits 3 and 4 of the register 919. The bits 6 and 7 of the register 904 are input into the OR-gate 940 and the output 943 of the OR-gate 940 is then mapped into bit 0 of the register 920. Other logical operations may be performed in future compatibility engines such as NOR, AND, NAND, XOR, XNOR in order to provide compatibility. The ORed bits 6 and 7 have their respective write map address designated values set to 63.

Figure 9E:
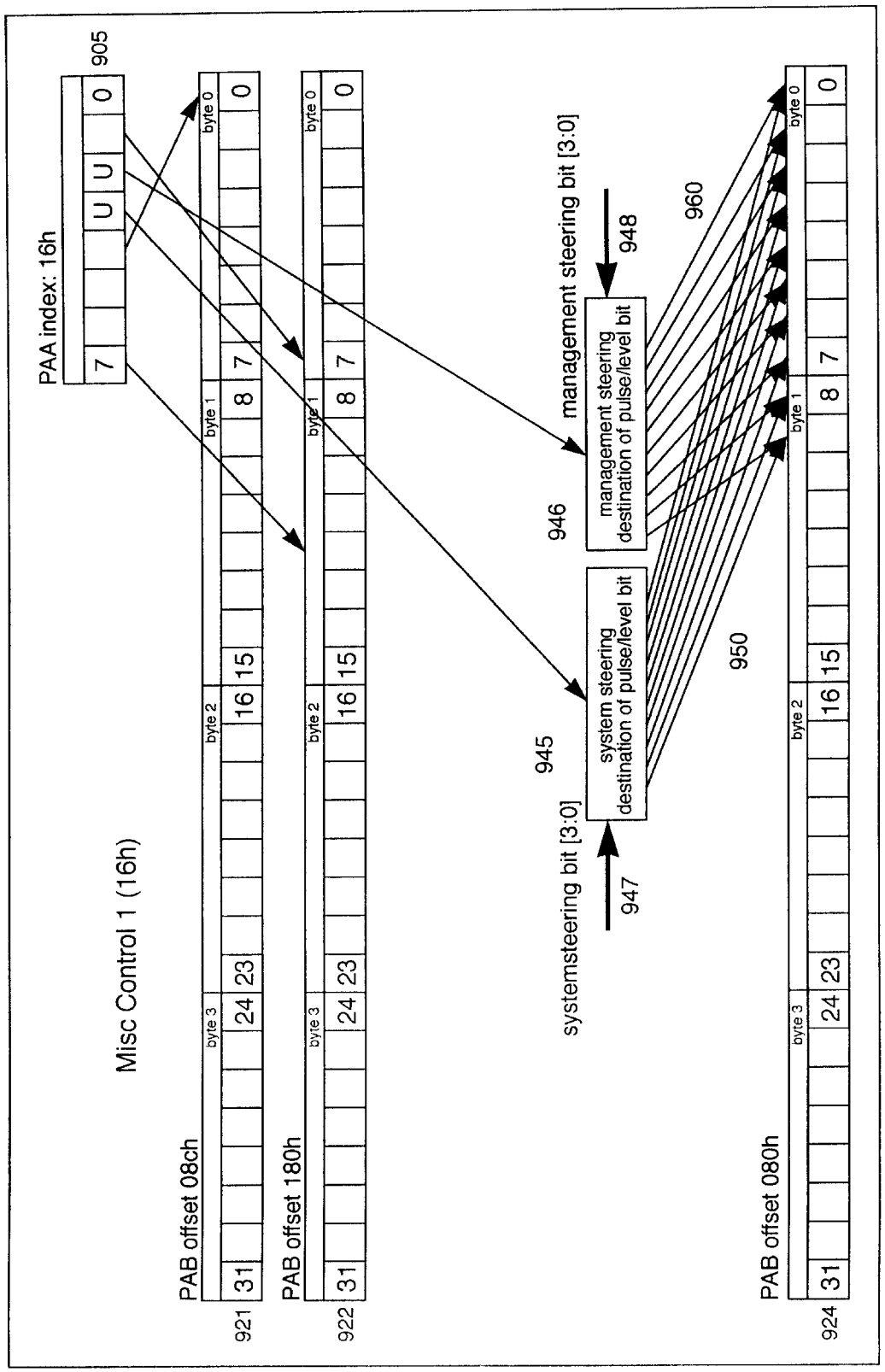

FIG. 9E illustrates the mapping of the bits of one eight bit register within the A register set 220 into four different registers within the B register set 320, where it is necessary to read other registers within the B register set 320 in order to determine the register location where the bits are to be mapped to. The eight bit register 905 having an index address of 16h is mapped into bits within the four thirty-two bit registers 921, 922, 923 and 924 having respective offset addresses of 08ch, 180h, 184h and 080h. The bit 4 of the register 905 is mapped to the bit 0 of the register 921. Bit 0 of the register 905 is presently non-mapped and unused by the B register set. Bits 1 and 7 of the register 905 are mapped into bits 6 and 11 of the register 911. Bits 5 and 6 of the register 905 are mapped to the bits 16 and 17 of the register 923. Bits 2 and 3 of the register 905 are unresolved and would have the write mapping address designated bits set to the value 63. To map bit 2 of the register 905, the management interrupt steering bits 948 are first read from a register. The management interrupt steering bits 948 are then used to map bit 2 of the register 905 into one of the bits 0 through 8 of the register 924, according to the value of the management interrupt steering bits 948. To map bit 3 of the register 905, the system interrupt steering bits 947 are first read from a register. The system interrupt steering bits 947 are then used to map bit 3 of the register 905 into one of the bits 0 through 8 of the register 924, according to the value of the system interrupt steering bits 947. The management interrupt steering bits 948 and the system interrupt steering bits 947 are stored within the PCMCIA host adapter B 408.

If the management interrupt steering bits 948 and the system interrupt steering bits 947 have the same value then a condition exists that is referred to as a "steering collision". One method of resolving this would be if the system interrupt steering bits 947 were last changed by the software they will override the management interrupt steering bits 948 and if the management interrupt steering bits 948 were last changed by the software they will override the system interrupt steering bits 947. The preferable method of resolving the steering collision is to logically examine the underlying values that are to be stored into the registers. If both the underlying values agree then case one occurs. If neither of the underlying values agree then case two occurs. This is a logical AND operation. For interrupt compatibility, when both values agree (00 or 11), then the selected type of polarity and pulse-level by the values is used. If the values disagree (01 or 10) then the interrupt is always a level interrupt with a HI logical polarity. Other logical operations may be used to resolve this condition in other instances. In other systems an error may be signaled and no mapping would occur. Because the system interrupt steering bits 947 and the management interrupt steering bits 948 both have to be read before the bits 2 and 3 of the register 905 can be mapped, an access of the register 905 will require the state machine to complete more states than accesses of the other registers described above.

FIG. 10A illustrates the mapping address functions during a non-native register write operation to the register 900 of the A register set 220, whose mapping was illustrated in FIG. 9A. The value contained within the write mapping address registers 716–718 for a non-native access to register 900 are illustrated by write map address one 1001, write map address two 1002 and write map address three 1003. These three write map addresses control how the bits of register 900 are mapped into the three registers 911, 912 and 913 having respective offset addresses of 180h, 190h and 194h. The numbers shown within the individual bit locations of the write map addresses 1001–1003 represent what bit they may be mapped to. A designated value of 0 through 31 means that a register bit having the designated value within the given register of the A register set is to be written into the corresponding bit within a given register of the B register set. The designated values 32 through 60 are presently reserved for future mappings and are currently unused. The values 61 and 62 are unused for a non-native write operation. During a non-native read operation the designated value 61 represents that a forced logical one is to be read out. During a non-native read operation the designated value 62 represents that a forced logical zero is to be read out. The designated value 63 represents that this bit is not mapped into the current register or a logical operation must occur on the bit or the mapping of this bit is presently unresolved and requires further steps to be determined. For example the write map address three 1003 has bits 0–3 and bits 5–7 set to 63 while bit 4 is set to 20. This indicates that bit 4 of the register 900 of the A register set is mapped into bit 20 of the register 913 of the B register set. Bits 0–3 and bits 5–7 of the register 900 are not mapped into any other bits of the register 913.

When the system desires to write to the register 900, the PAA register write signal line 627 is raised to a logical high voltage level indicating a non-native register write operation, the register address is placed on the compatibility address bus 662, the index register address is placed on PAA_index bus 660, and the data to be written is placed on the compatibility data bus 620. The compatibility sequencer 610 recognizes this address as a non-native access having an address corresponding to the A register set 220. The compatibility decoder 732 initiates the mapping sequence and activates the appropriate one of the decode n signal lines 758 and the register models and sequencer circuit 734 retrieves the corresponding template within group three. Write map address one 1001, write map address two 1002, and write map address three 1003 are then loaded into the write mapping address registers 716–718, respectively. The offset register addresses 180h, 190h and 194h representing the registers 911–913 are sequentially output onto the internal address bus 663. The write mapping logic circuit 714 then reads write map address one 1001 from the first write mapping address register 716. Data stored in the register 911 is loaded into the thirty-two bit latch 602. As illustrated by the write map address one 1001 in FIG. 10A, the value of the bits 5, 6 and 7 of the register 900 overwrite bits 9, 8 and 12, respectively, of the output from the thirty-two bit latch 602 by logic contained in the write mapping logic circuit and are output onto the write data signal bus 630. Bits 0–7, 10–11, 13–31 output from the thirty-two bit latch 602 are not modified by the write map address one 1001 by the write mapping logic circuit 714 and pass through onto the write data signal bus 630. Through the system bus interface circuit 608B the output from the write mapping logic circuit 714 on the write data signal bus 630 is written back into register 911 of the B register set.

The write mapping logic circuit 714 then reads the write map address two 1002 from the second write mapping address register 717. Data stored in the register 912 is loaded into the thirty-two bit latch 602. As illustrated by the write map address two 1002 in FIG. 10A, the value of bits 0–3 of the register 900 respectively overwrite bits 0–3 output from the thirty-two bit latch 602 while bits 4–31 remain unchanged by the write mapping logic circuit 714. Through the system bus interface circuit 608B the output from the write mapping logic circuit 714 is written into register 912 of the B register set.

The write mapping logic circuit 714 then reads the write map address three 1003 from the third write mapping address register 718. Data stored in the register 913 is loaded into the thirty-two bit latch 602. The value of bit 4 of the register 900 over-writes bit 20 that is output from the thirty-two bit latch 602 while bits 0–19 and 21–31 remain unchanged by the write mapping logic circuit 714. Through the system bus interface circuit 608B the output from the write mapping logic circuit 714 is written into register 912 of the B register set completing the non-native register write operation into register 900 of the A register set.

Figure 10B:
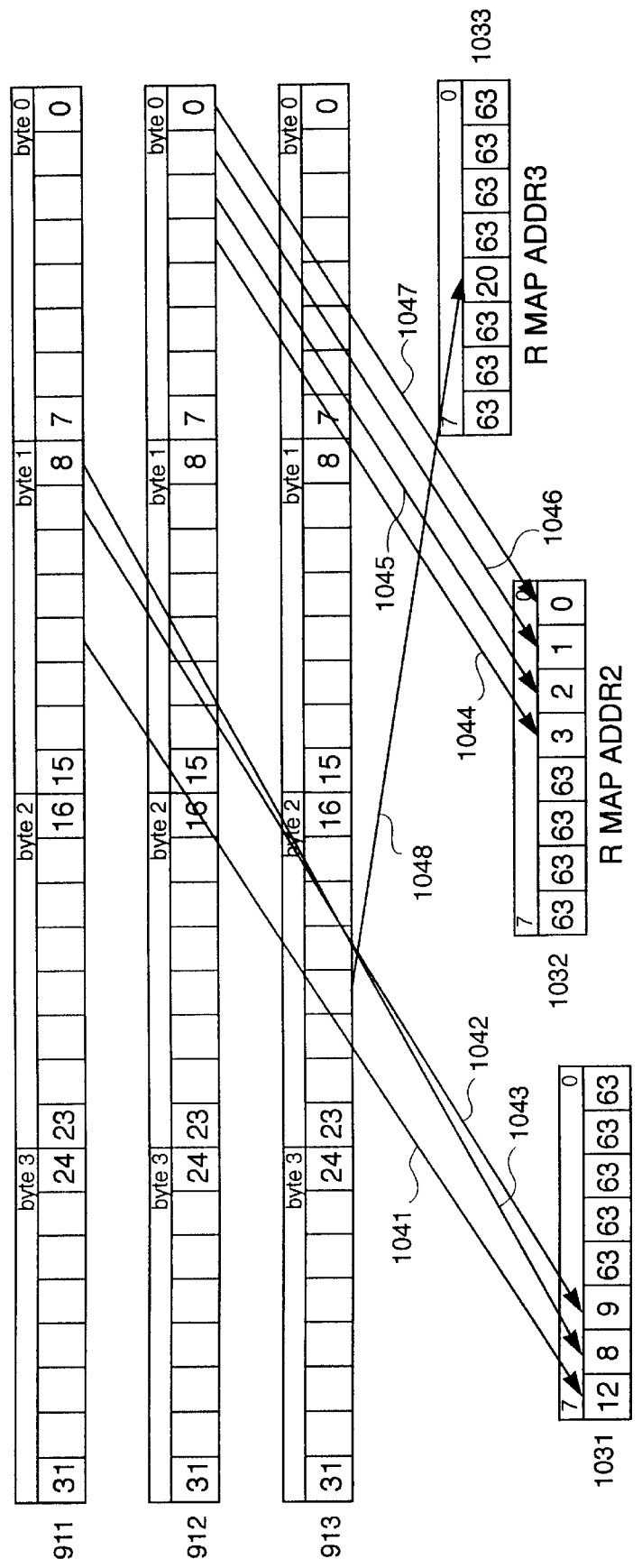
FIG. 10B illustrates the mapping function for a read operation from a register within the A register set.

FIG. 10B illustrates the mapping address functions during a non-native register read operation to the register 900 of the A register set 220, having the mapping as illustrated in FIG. 9A. The value contained within the write mapping address registers 716–718 for a non-native access to register 900 are illustrated by read map address one 1031, read map address two 1032 and read map address three 1033. These three read map addresses control how the bits of the three registers 911, 912 and 913 having respective offset addresses 180h, 190h and 194h are mapped into register 900. The numbers shown within the individual bit locations of the read map addresses 1031–1033 represent what bit they may be mapped to. A designated value of 0 through 31 means that a register bit having the designated value within the given register of the B register set is to be written into the corresponding bit within a given register of the A register set. The designated values 32 through 60 are presently reserved for future mappings and are currently unused. For a non-native read operation the designated value 61 means that the corresponding bit within the given register of the A register set is to be forced to a logical one. For a non-native read operation the designated value 62 means that the corresponding bit within the given register of the A register set is to be forced to a logical zero. The designated value 63 represents that this bit is not mapped into the current register or a logical operation must occur on the bit or the mapping of this bit is presently unresolved and requires further steps to be determined. For example the read map address one 1031 has bits 0–4 set to 63, bit 5 is set to 9, bit 6 is set to 8, and bit 7 is set to 12. This indicates that bit 9 of the register 911 is to be mapped into bit 5 of the register 900; bit 8 of register 911 is to be mapped into bit 6 of the register 900; and bit 12 of the register 911 is mapped into bit 7 of the register 900. No other bits from register 911 map into any other bits of the register 900.

When the system desires to read from the register 900, the PAA register read signal line 626 is raised to a logical high voltage level indicating a non-native register read operation, the register address is placed on the compatibility address bus 662, and the index register address is placed on PAA__ index bus 660. The compatibility sequencer 610 recognizes this address as a non-native access having an address corresponding to a register within the A register set 220. The compatibility decoder 732 initiates the mapping sequence and activates the appropriate one of the decode n signal lines 758 and the register models and sequencer circuit 734 retrieves the corresponding template from the third group. Read map address one 1031, read map address two 1032, and read map address three 1033 are then loaded into the read mapping address registers 710–712, respectively. The offset register addresses 180h, 190h and 194h representing the registers 911–913 are sequentially output onto the internal address bus 663. The read mapping logic circuit 708 then reads the read map address one 1031 from the first read mapping address register 710. Data stored in the register 911 is retrieved, driven onto the internal system data bus 621, and into the read mapping logic circuit 708. As illustrated by the read map address one 1031 in FIG. 10B, bits 12, 8 and 9 of the register 911 are mapped by the read mapping logic circuit 708 and then loaded into bits 7, 6 and 5 of the eight bit independent clocking latch 706. The read mapping logic circuit 708 next reads the read map address two 1032 from the second read mapping address register 711. Data stored in the register 912 is retrieved, driven onto the internal system data bus 621, and into the read mapping logic circuit 708. As illustrated by the read map address two 1032 in FIG. 10B, bits 0–3 of the register 912 are mapped by the read mapping logic circuit and then loaded into bits 0–3 of the eight bit independent clocking latch 706. The read mapping logic circuit 708 then reads the read map address three 1033 from the third read mapping address register 712. Data stored in the register 913 is retrieved, driven onto the internal system data bus 621, and into the read mapping logic circuit 708. As illustrated by the read map address three 1033 in FIG. 10B, bit 20 of the register 913 is then loaded into bit 4 of the eight bit independent clocking latch 706. To complete the read operation, the contents of the eight bit independent clocking latch 706 are output as bits 8–15 of the 32 bit read data signal bus 631. Description of how the other bits are joined to create the entire 32 bit read data signal bus 631 is described above.

NATIVE REGISTER ACCESSES

When the system receives a native register access by addressing a given register within the B register set 320, no mapping or compatibility operation needs to take place such that all data bits to or from the B register set passes through the compatibility engine 422 unchanged. The compatibility sequencer 610 passes the slot decode 622, chip decode 623, register read 624 and register write 625 signals unchanged to the register decoders 612. The address of the register to be accessed is also passed through the compatibility sequencer to the register decoders 612 unchanged.

For a native register write operation, data to be written to the registers 614 is driven onto the compatibility data bus 620 which passes through the internal data bus interface circuit 608B and onto the internal system data bus 621. In this case the CMPWRTEN signal 679 is a logic zero disabling tristate driver 703 and NATWRTEN signal 678 is a logic one enabling tristate driver 705, indicating that a native register write is to take place, and driving the data from the compatibility data bus 620 onto the internal system bus 621. In this manner the data that is to be written into the registers 614 bypasses the read/write bit steering circuit 606 that performs the mapping and modification of any bits to provide compatibility.

For a native register read operation, data to be read from the registers 614 is driven onto the internal system bus 621, through the compatibility interface circuit 608A, and onto the compatibility data bus 620. In this case the signals PAA REG RD 626 and PAA-RDEN 676 are a logic zero, indicating a native register read, such that the internal system bus 621 is multiplexed onto bus 741 and driven onto the compatibility data bus 620 by the tri-state driver 702 when READEN 674 is asserted. In this manner the data read from the registers 614 bypasses the read/write bit steering circuit 606 that performs the mapping and modification of any bits to provide compatibility.

INTERRUPTS

Figure 11:
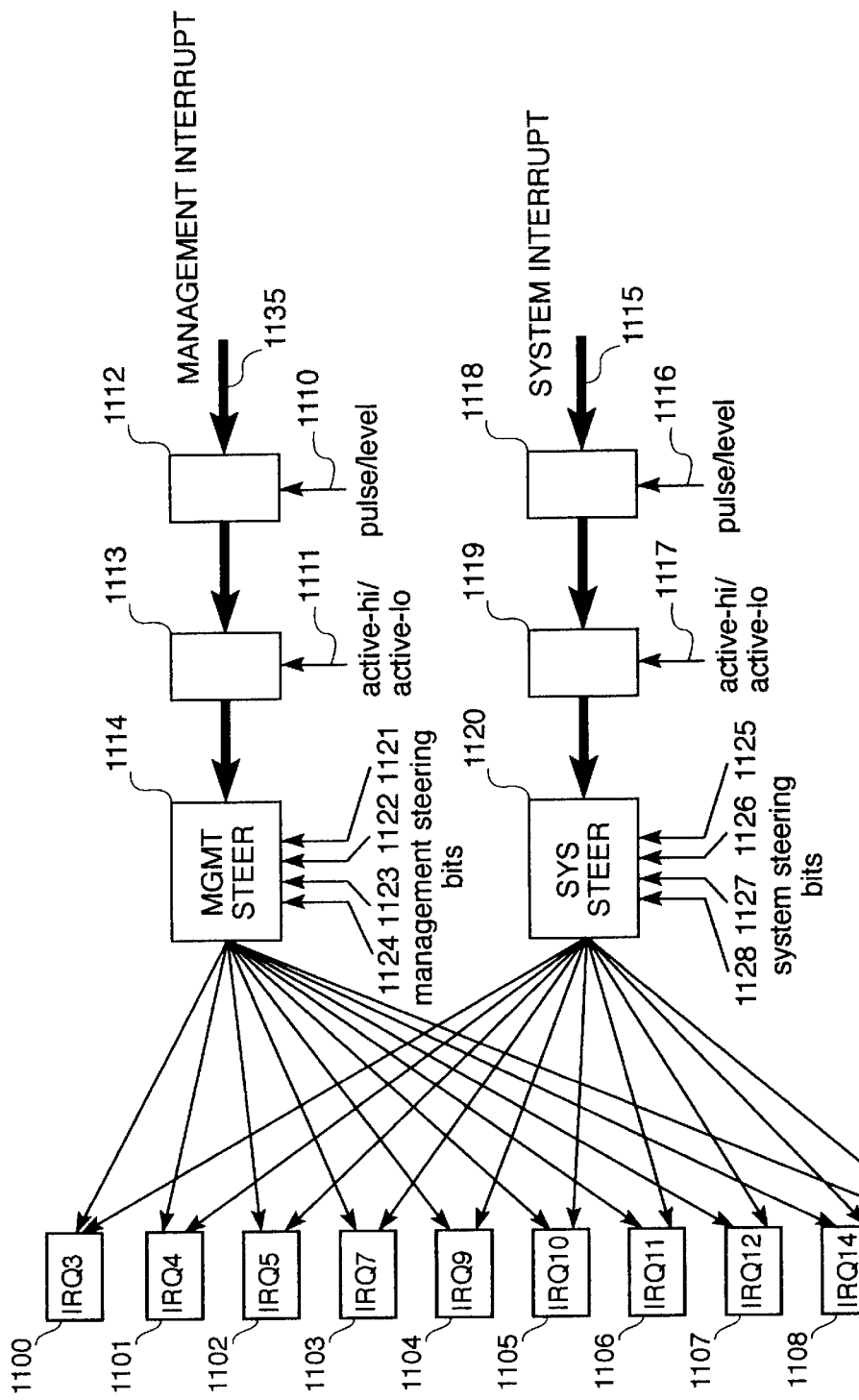
FIG. 11 illustrates a schematic block diagram of a first interrupt scheme.
Figure 12:
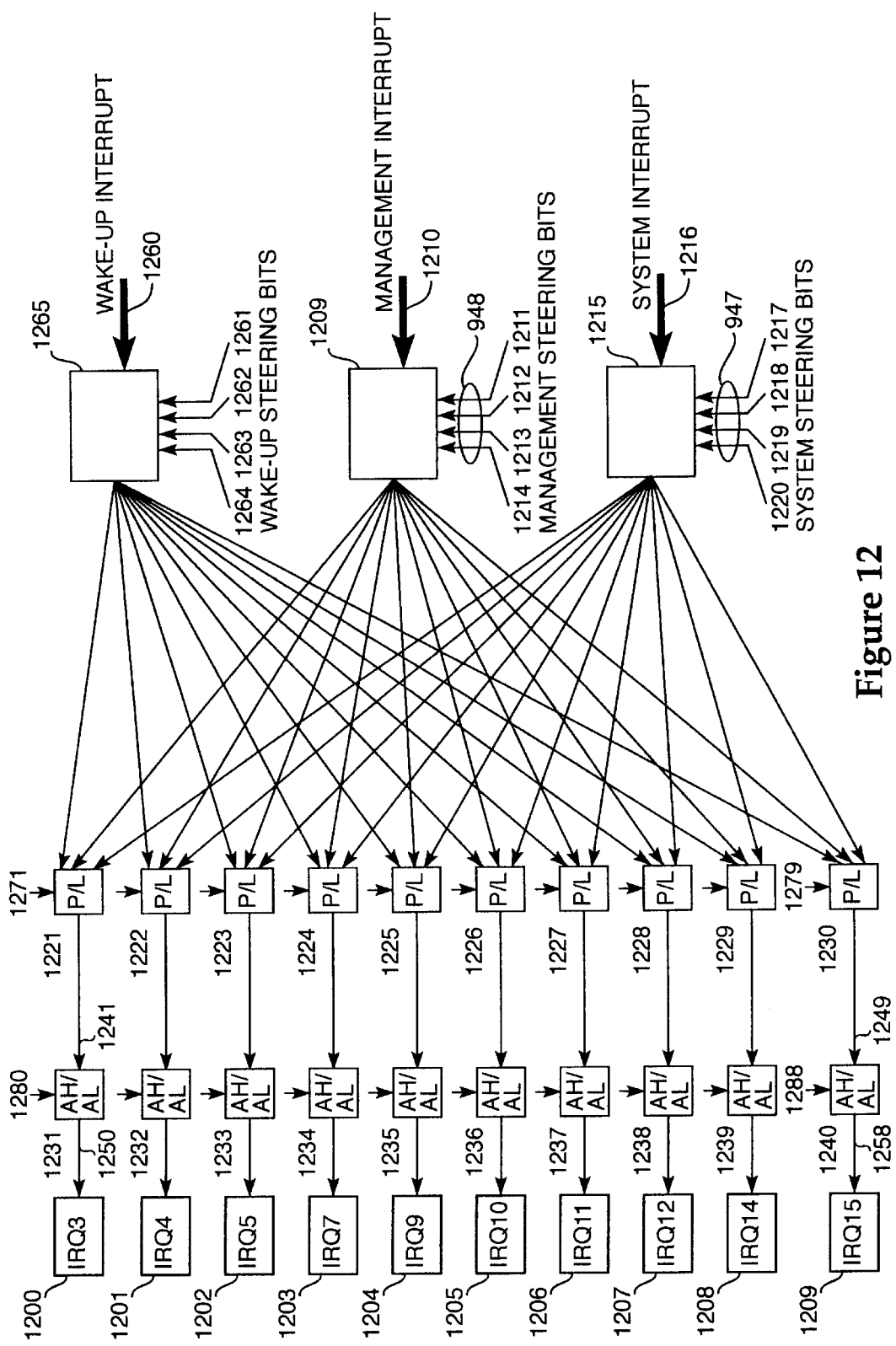
FIG. 12 illustrates a schematic block diagram of the interrupt scheme of the present invention.

The interrupt circuitry of the present invention provides for improved waveform shaping control and flexible interrupt signal support for various busses. The interrupt circuity of the present invention in conjunction with the compatibility engine provides interrupt compatibility for previous versions of software that were written for previous versions of hardware. FIG. 12 illustrates a functional block diagram of the interrupt logic circuitry contained within the PCMCIA host adapter B 408. FIG. 11 illustrates a functional block diagram of previous interrupt logic circuitry contained in a PCMCIA adapter. In FIG. 11, the interrupt waveform is shaped by the pulse/level control circuits 1112 and 1118 and by the active-hi/active-lo control circuits 1113 and 1119, prior to being steered to the I/O pads and drivers 1100–1109 by the steering logic circuits 1114 and 1120. In FIG. 12, the interrupt waveform is shaped by the pulse/level control circuits 1221–1230 and the active-hi/active-lo circuits 1231–1240, after the steering logic circuits 1265, 1270, and 1215 have steered the interrupt signal to the appropriate I/O pads and drivers 1200–1209.

The interrupt logic circuitry of the present invention consistently applies the appropriate waveform shaping to each pad. For example IRQ3 at pad 1200 may be shaped to be an active hi logic signal using a pulsed waveform, such as waveform 1402 in FIG. 14, while IRQ15 at pad 1209 may be shaped to be an active low logic signal using a level waveform, such as waveform 1409 in FIG. 14. Any of the three types of interrupts can be steered by the steering circuit to any pad without the output waveform shape being modified. With the previous interrupt circuit of FIG. 11, this would not be the case if waveform shapes for the system and management interrupts are incompatible. Also, the previous circuit of FIG. 11 allows only two different waveform shapes to occur at the pads 1100–1109, while the present invention allows a different waveform shape at each of the pads 1200–1209.

The PCMCIA host adapter B 408 includes three types of interrupts: a new PCMCIA interrupt type referred to as wake-up interrupt 1260; a management interrupt 1210; and a system interrupt 1216. The wake-up interrupt signals to a system in an idle state that it should prepare itself for data which will be sent. The wake-up interrupt signal 1260 is coupled as an input to the wake-up steering logic circuit 1265. The wake-up interrupt steering bits 1261–1264 are coupled as inputs to the wake-up interrupt steering logic circuit 1265, for steering the wake-up interrupt signal to the appropriate one of the interrupt request pads 1200–1209. The wake-up interrupt steering bits 1261–1264 are written into one of the interrupt control registers within the PCMCIA host adapter B 408. A different output signal line, from the wake-up interrupt steering logic circuit 1265, for each interrupt request pad 1200–1209, is coupled as an input to each of the pulse/level control circuits 1221–1230.

The management interrupt signal 1210 is coupled as an input to the management interrupt steering logic circuit 1270. The management interrupt steering bits 1211–1214 are coupled as inputs to the management interrupt steering logic circuit 1270, for steering the management interrupt signal to the appropriate one of the interrupt request pads 1200–1209. A different output signal line, from the management interrupt steering logic circuit 1270, for each interrupt request pad 1200–1209, is coupled as an input to each of the pulse/level control circuits 1221–1230.

The system interrupt signal 1216 is coupled as an input to the system interrupt steering logic circuit 1215. The system interrupt steering bits 1217–1220 are coupled as inputs to the system interrupt steering logic circuit 1215, for steering the system interrupt signal to the appropriate one of the interrupt request pads 1200–1209. A different output signal line, from the system interrupt steering logic circuit 1215, for each interrupt request pad 1200–1209, is coupled as an input to each of the pulse/level control circuits 1221–1230.

The outputs of the pulse/level control circuits 1221–1230 are coupled as inputs to the active-hi/active-lo control circuits 1231–1240. Outputs of the active-hi/active-lo control circuits 1231–1240 are coupled to the interrupt request pads 1200–1209.

The pulse/level control circuits 1221–1230, respectively coupled to each of the interrupt request pads 1200–1209, are each controlled by a separate control line, such as 1271 and 1279, to shape the interrupt request signal into a pulse waveform or a level waveform. The active-hi/active-lo control circuits 1231–1240, respectively coupled to each of interrupt request pads 1200–1209, are each controlled by a separate control line, such as 1280 and 1288, to shape the interrupt request signal into an active high or active low signal. If the interrupt request is selected to be an active low signal, then the interrupt request pad will be driven to a logical zero level to indicate an interrupt request. If the interrupt request signal is selected to be an active high signal, then the interrupt request pad will be driven to a logical one level to indicate an interrupt request.

Figure 13:
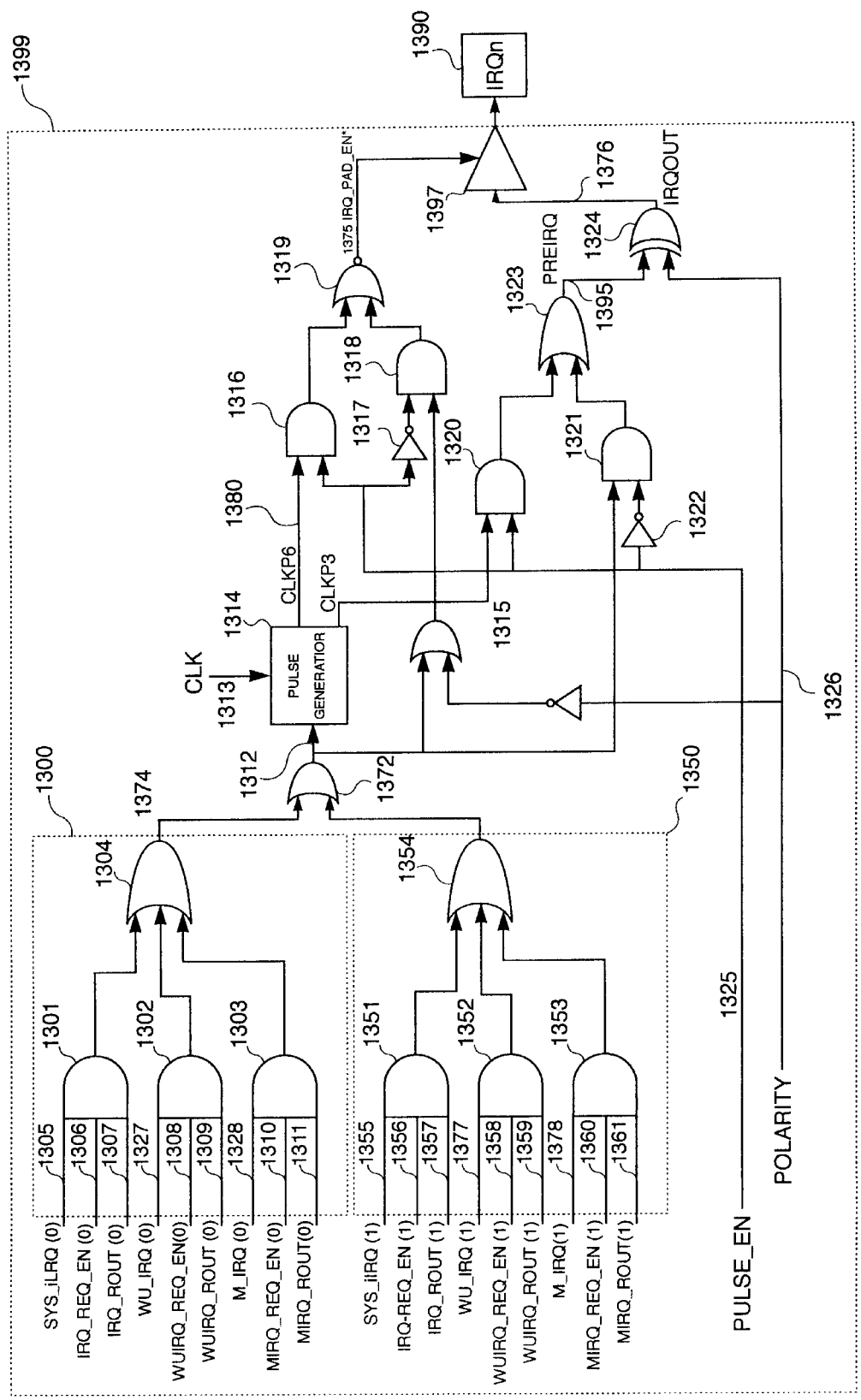
FIG. 13 illustrates a schematic block diagram of interrupt logic associated with one interrupt pad.

FIG. 13 illustrates a schematic diagram of one interrupt pad and accompanying logic circuitry for a two slot PCMCIA host adapter. Each of the pads 1200–1209 may provide an interrupt request onto a system bus in response to receiving a system, management, or wakeup interrupt from a peripheral in either of two PCMCIA slots. Basically, when enabled, the three interrupt signals for each PCMCIA slot are ORed together by OR gate 1304 or 1354. Then, the resulting output signals from OR gates 1304 and 1354 are ORed together by OR gate 1372 and then coupled to pad 1390. Because the three interrupt signals for each slot are ORed together, the system of the present invention does not allow an interrupt clash. If there is an interrupt request signal from either slot, steered to the pad by steering circuits, the logical OR operations by OR gates 1304, 1354 and 1372 are performed, then, the interrupt request signal is shaped by a pulse/level control circuit and an active-hi/active-lo control circuit. The resulting interrupt request signal is then output to an interrupt signal trace in a system board or system bus that is coupled to the interrupt pad 1390. Because the interrupt request signal is shaped differently for each interrupt pad, more than one interrupt may be simultaneously steered to the same pad, and the resulting waveform is uniform, as if only a single interrupt request was generated.

In the circuit illustrated in FIG. 13, the system interrupt request signal for slot(0), SYS_iIRQ(0) 1305, is coupled as an input to the AND gate 1301. The interrupt request signals, SYSiIRQ, WU_IRQ, and M_IRQ are interrupt request signals that come from a peripheral coupled to the PCMCIA slot and should not be confused with the interrupt request signals, IRQn, that are generated by the circuitry of the present invention at the pad 1390. The system interrupt request enable signal for slot(0), IRQ_REQ_EN(0) 1306, is also coupled as an input to the AND gate 1301. The interrupt request enable signals, IRQ_REQ_EN, WUIRQ_REQ_EN, and MIRQ_REQ_EN are single bits within an interrupt control register that enable or mask types of interrupts from a peripheral that may or may not be passed to a system bus. The system interrupt request routing signal for slot(0), IRQ_ROUT(0) 1307, is coupled as an input to the AND gate 1301. The interrupt request routing signals, IRQ_ROUT, WUIRQ_ROUT, and MIRQ_ROUT are determined by respectively decoding the system interrupt steering bits, wakeup interrupt steering bits, and management interrupt steering bits contained within respective interrupt control registers. The wake-up interrupt request signal for slot(0), WU_IRQ(0) 1327, is coupled as an input to the AND gate 1302. The wake-up interrupt request enable signal for slot(0), WUIRQ_EN(0) 1308, is also coupled as an input to the AND gate 1302. The wake-up interrupt request routing signal for slot(0), WUIRQ_ROUT(0) 1309, is coupled as an input to the AND gate 1302. The management interrupt signal for slot(0), M_IRQ(0) 1328, is coupled as an input to the AND gate 1303. The management interrupt request enable signal for slot(0), MIRQ_REQ_EN(0) 1310, is also coupled as an input to the AND gate 1303. The management interrupt request routing signal for slot(0), MIRQ_ROUT(0) 1311, is coupled as an input to the AND gate 1303. The outputs of the AND gate 1301, the AND gate 1302 and the AND gate 1303 are coupled as inputs to the OR gate 1304. The output of the OR gate 1304 is coupled as an input to the OR gate 1372.

The system interrupt request signal for slot(1), SYS_iIRQ(1) 1355, is coupled as an input to the AND gate 1351. The system interrupt request enable signal for slot(1), IRQ_REQ_EN(1) 1356, is also coupled as an input to the AND gate 1351. The system interrupt request routing signal for slot(1), IRQ_ROUT(1) 1357, is coupled as an input to the AND gate 1351. The wake-up interrupt request signal for slot(1), WU_IRQ(1) 1377, is coupled as an input to the AND gate 1352. The wake-up interrupt request enable signal for slot(1), WUIRQ_REQ_EN(1) 1358, is also coupled as an input to the AND gate 1352. The wake-up interrupt request routing signal for slot(1), WUIRQ_ROUT 1359, is coupled as an input to the AND gate 1352.

The management interrupt signal for slot(1), M_IRQ(1) 1378, is coupled as an input to the AND gate 1353. The management interrupt request enable signal for slot(1), MIRQ_REQ_EN(1) 1360, is also coupled as an input to the AND gate 1353. The management interrupt request routing signal for slot(1), MIRQ_ROUT(1) 1361, is coupled as an input to the AND gate 1353. The outputs of the AND gate 1351, the AND gate 1352 and the AND gate 1353 are all coupled as inputs to the OR gate 1354. The output of the OR gate 1354 is coupled as an input to the OR gate 1372.

The output of the OR gate 1372 is coupled as an input to the pulse generator circuit 1314, to the OR gate 1330 and to the AND gate 1321. A clock signal 1313 is coupled as a control input to the pulse generator 1314. An output pulsed signal 1380 from the pulse generator 1314, has a pulse width duration of six clock signal cycles and is coupled as an input to the AND gate 1316. An output pulsed signal 1315 from the pulse generator 1314, has a pulse width duration of three clock signal cycles and is coupled as an input to the AND gate 1320. The output pulsed signal 1380 and 1315 are generated in response to one of the interrupt signals that may be generated. The pulse enable signal 1325 is coupled as an input to the AND gate 1316, to the invertor 1317, to the AND gate 1320 and to the invertor 1322. The output of the invertor 1317 is coupled as an input to the AND gate 1318. The output of the invertor 1322 is coupled as an input to the AND gate 1321. The polarity control line 1326 is coupled as an input to the inverter 1332. The output of the inverter 1332 is coupled as an input to the OR gate 1330. The output of the OR gate 1330 is coupled as an input to the AND gate 1318. The outputs of the AND gates 1316 and 1318 are both coupled as inputs to the NOR gate 1319. The outputs of the AND gates 1320 and 1321 are both coupled as inputs to the OR gate 1323. The output of the OR gate 1323 is coupled as an input to the exclusive-OR gate 1324. The polarity control line 1326 is also coupled as an input to the exclusive-OR gate 1324 for controlling whether or not the interrupt request signal is active high or active low. The IRQ_PAD_EN* control line 1375 is coupled as an output of the NOR gate 1319. The output of the exclusive-OR gate 1324, IRQOUT line 1376, is coupled to tristate output buffer 1397. Tristate output buffer 1397 is coupled to the pad 1390 to drive signals from IRQOUT line 1376 onto the pad in response to an enable signal on IRQ_PAD_EN* control line 1375.

As illustrated in FIG. 13, if there is an interrupt request from either slot that is steered to the respective pad, then the pulse generator 1314 and according logic circuitry controls whether or not the interrupt request signal is a pulse or level signal, while the polarity signal 1326 and according logic circuitry, controls whether or not the signal will be an active high or active low signal. If the polarity signal 1326 is at a logical high voltage level, then the interrupt request signal will be active low. If the polarity signal 1326 is at a logical low voltage level, then the interrupt request signal will be active high. Each interrupt pad 1200–1209 is coupled to the according control circuitry as illustrated in FIG. 13. Because this circuitry is coupled to the interrupt pad itself, after the interrupt signals have been steered by steering control circuits 1265, 1270 and 1215, each interrupt pad can have a differently shaped interrupt request signal, configured for the device coupled to the interrupt pad.

Figure 14A:
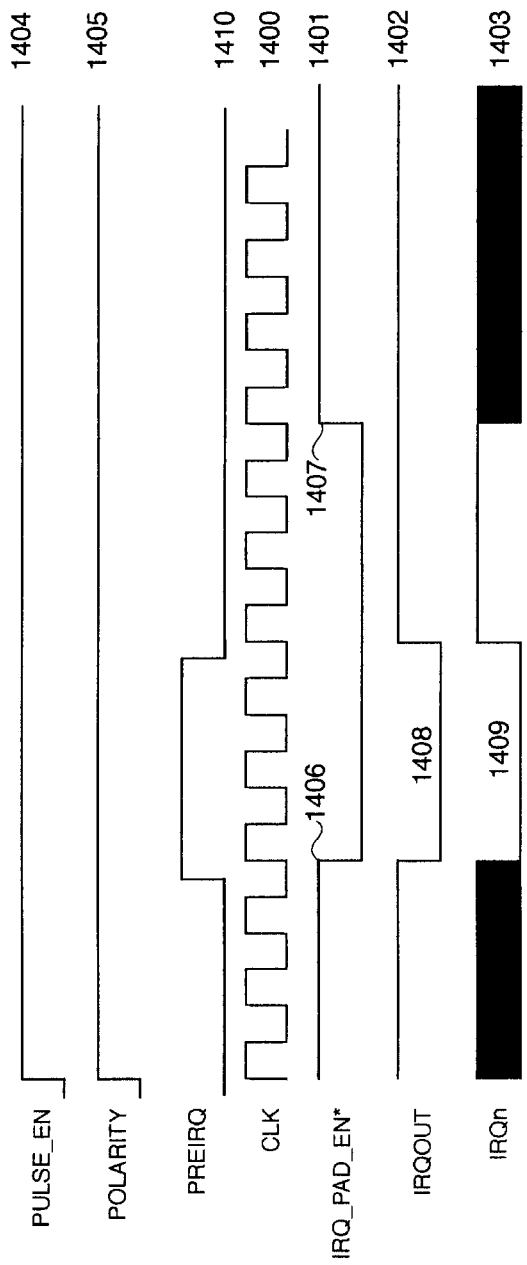
FIG. 14A and 14B illustrate interrupt request waveforms that are generated at an interrupt pads according to the circuitry of the present invention illustrated by FIG. 13.
Figure 14B:
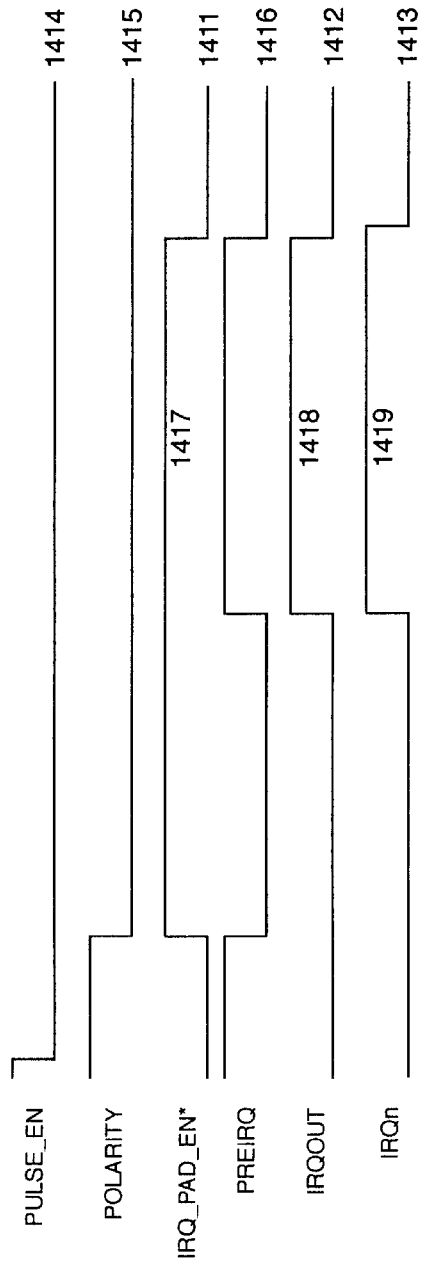

FIGS. 14A and 14B illustrate waveform diagrams of the IRQ_PAD_EN* signal 1375 and the IRQOUT signal 1376 generating IRQn 1390. A clock signal 1400 is shown in FIG. 14A for an approximate reference for the generation of the pulse waveform output. In FIG. 14A, PULSE_EN signal 1325 and POLARITY signal 1326, as illustrated by waveforms 1404 and 1405, are switched to an active high state such that the interrupt request signal is to be shaped as an active low and pulsed signal. When an interrupt signal 1305,1327,1328,1355,1377, or 1378 is asserted, the IRQ_PAD_EN* waveform 1401 is active between the points 1403 and 1404 for a period of approximately six clock cycles, independent from the periods of these interrupt signals. Because the interrupt request signal is an active low pulsed signal, the IRQOUT waveform 1402 is only at a logical high voltage level during three clock periods 1405. This corresponds to an active low pulse waveform output 1409 in the waveform 1403 of IRQn, thereby signalling an interrupt request to the device coupled to the accompanying pad. The rest of the time the IRQOUT waveform 1402 is at a high impedance state. The shaded area of waveforms 1403 and 1413 indicate a high impedance condition in output driver 1397, such that the output IRQn is allowed to float by the driver 1397. In FIG. 14B, PULSE_EN signal 1325 and POLARITY signal 1326, as illustrated by waveforms 1414 and 1415, are switched to an active low state such that the interrupt request signal is to be shaped into an active low and level signal. The IRQ_PAD_EN* waveform 1411, IRQOUT waveform 1412, and IRQn waveform 1413 are generated independently from the clock 1400 as illustrated by pulses 1417–1419. When an interrupt signal 1305,1327, 1328,1355,1377, or 1378 is asserted, and the interrupt request signal is selected to be shaped as an active low level signal, the IRQOUT waveform 1409 and IRQ_PAD_EN waveform 1411 that are generated are logical low level signals. This corresponds to an active low level waveform output 1419 in the waveform 1413 of IRQn, thereby signalling an interrupt request to the device coupled to the according pad. The period of the active low level signal 1419 is a function of the period of the assertion of interrupt signals 1305,1327,1328,1355,1377, and 1378. When the interrupt signal 1305,1327,1328,1355,1377, or 1378 is de-asserted, the IRQOUT waveform 1409 and IRQ_PAD_EN* waveform 1411 return to logical high voltage levels and the IRQn waveform 1413 returns to a tristate condition.

INTERRUPT COMPATIBILITY

Figure 15:
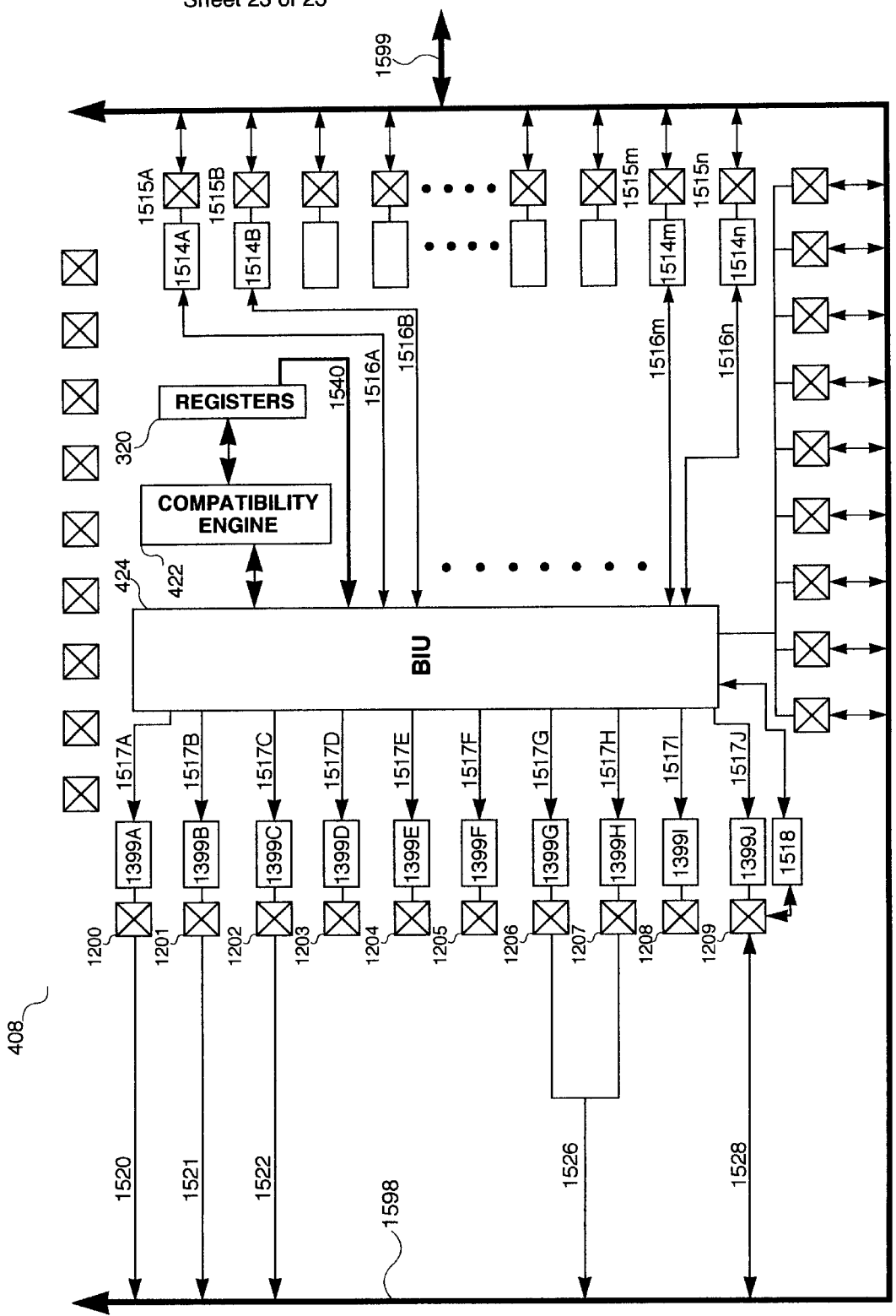
FIG. 15 illustrates part of a system and connection of the preferred embodiment of the PCMCIA host adapter of the present invention.

FIG. 15 illustrates a block diagram of the PCMCIA host adapter B and the coupling of the interrupt pad control circuit 1399 to each of the pads 1200–1209 and the bus interface unit 424. In FIG. 15, the interrupt pad control circuit 1399 of FIG. 13 is instanciated into interrupt pad control circuits 1399A–1399J. The bus interface unit 424 couples to each interrupt pad control circuit 1399A–1399J respectively through signal busses 1517A–1517J, representing signals 1305–1311, 1327–1328, 1355–1361, 1377–1378, and 1325–1326 of FIG. 13. Interrupt pad control circuits 1399A–1399J are respectively coupled to the interrupt pads 1200–1209. The interrupt pads 1200–1209 can be coupled in various ways to bus 1598, which is coupled to the system bus 1599. The system bus 1599 can be of different types such as ISA, PCI, or VL bus. Other inputs and outputs, such as data and address signals, are interfaced between the system bus 1599 and the bus interface unit 424. Pads 1515A–1515n (n being a variable) are respectively coupled to I/O buffers 1514A–1514n, which are respectively coupled to bidirectional signal lines 1516A–1516n. Signal lines 1516A–1516n are coupled to the bus interface unit 424.

It is desirable, that the PCMCIA host adapter B be able to interface to various bus types such as PCI and ISA. These various bus types will have differing numbers of interrupt signal lines and require combining interrupts to a single pad internally, or combining interrupts from two pads externally onto a single interrupt signal line. For example, multiple interrupts can be combined internally within the BIU 424 into a single interrupt signal, and can be routed over signal bus 1517C, through interrupt pad control circuit 1399C, and driven onto a single interrupt control line 1522 of a given bus type. Alternatively, separate interrupts, from interrupt pad control circuits 1399G and 1399H, can be wire-ored together externally onto a single interrupt control line 1526. Other bus types may have multiple interrupt control lines. For example, interrupt control lines 1520, 1521, and 1522 can be driven with separate interrupt sources from interrupt pad control circuits 1399A–1399C. Using previous versions of hardware, such as that illustrated by FIG. 11, this capability of supporting the differing interrupt control lines for various bus types was difficult.

Figure 9F:
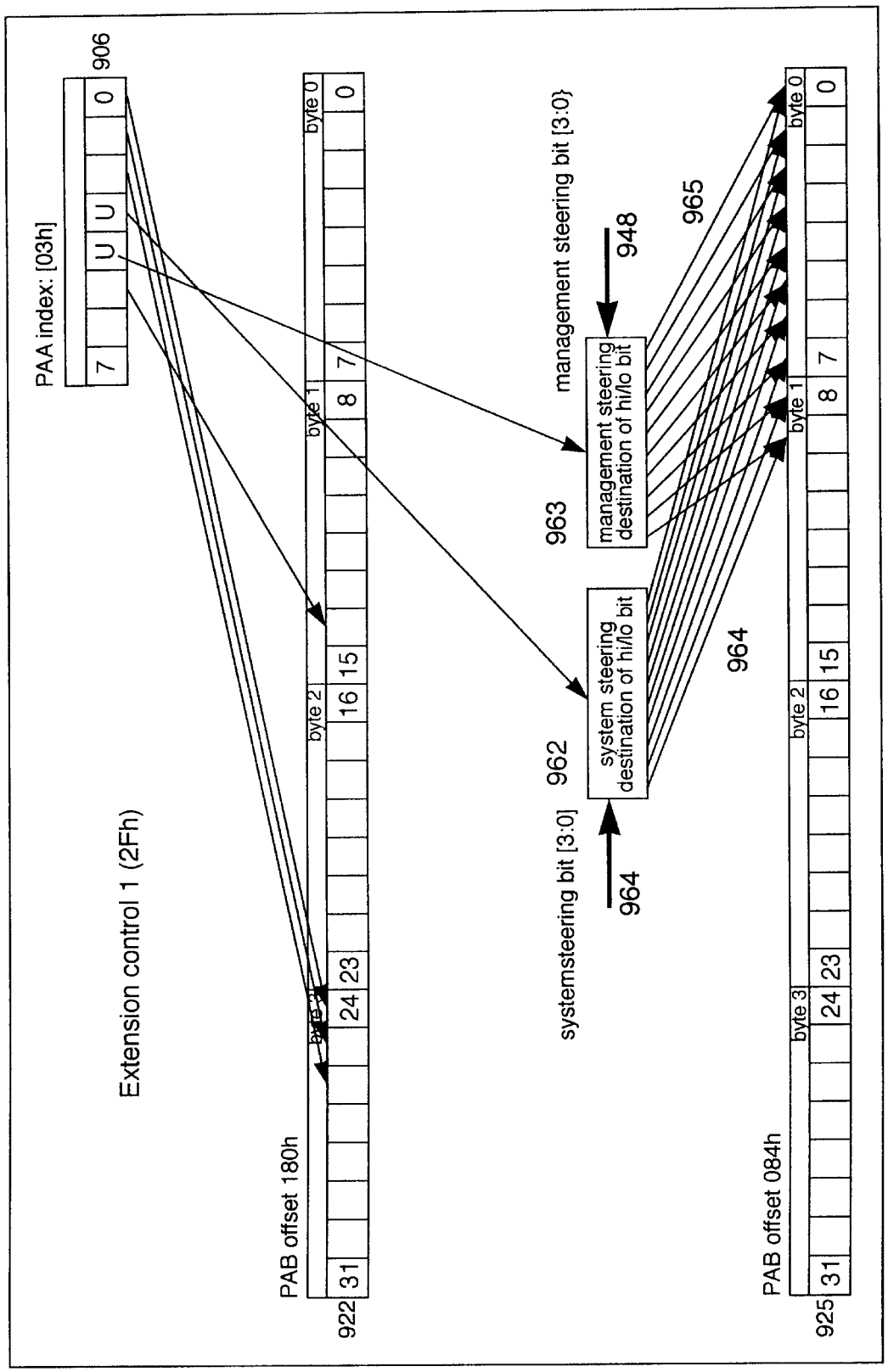

It is also desirable, that the interrupt hardware of the PCMCIA host adapter B be compatible with previous versions of software, that were developed for interrupt hardware of previous PCMCIA host adapters. For example, previous versions of software that generate interrupt control signals, for interrupt hardware and registers within PCMCIA host adapter A, must be made compatible with the interrupt hardware and registers within the PCMCIA host adapter B. The compatibility engine 422, interrupt control circuitry within the BIU 424, and other control logic within PCMCIA host adapter B 408 are used to provide interrupt compatibility. In FIG. 11, the PCMCIA host adapter A requires 2 bits within a register, bits 2 and 3 of Misc Control 1 register (16h) 905, to control whether a pulse or level interrupt waveform was selected, and 2 bits within a register, bits 3 and 4 of Extension Control 1 register (03h) 906, to control whether an active hi or active low waveform was selected for the system and management interrupt signals. In FIG. 12, the PCMCIA host adapter B requires 10 bits within a register, bits 0–9 of Interrupt Pulse Control register (080h) 924, to control whether a pulse or level interrupt waveform is selected, and 10 bits within a register, bits 0–9 of Interrupt Polarity Control register (084h) 925, to control whether an active hi or active low waveform is selected for each interrupt request pad. In the non-native access mode, the compatibility engine converts the non-native register access for the 2 bits, within the Misc Control 1 register 905 of the PCMCIA host adapter A, into 10 bits for the Interrupt Pulse Control register 924 of the PCMCIA host adapter B, as illustrated in FIG. 9E. FIG. 9E further illustrates how bit 2 is directed by the system interrupt steering bits 1217–1220, illustrated as system steering bit[3:0] 947, and how bit 3 is directed by the management interrupt steering bits 1211–1214, illustrated as management steering bit[3:0] 948. In this manner, the compatibility engine selectively maps the single bit 2 or bit 3 into multiple bits of the Interrupt Pulse Control register 924. As illustrated in FIG. 9F, the 2 bits, of the Extension Control 1 register 906 of the PCMCIA host adapter A, is converted into 10 bits, of the Interrupt Polarity Control register 925 of the PCMCIA host adapter B, for a non-native access. FIG. 9F further illustrates how bit 3 is directed by the system interrupt steering bits 1217–1220, illustrated as system steering bit[3:0] 947, and how bit 4 is directed by the management interrupt steering bits 1211–1214, illustrated as management steering bit[3:0] 948, selectively map the single bit 3 or bit 4 into multiple bits of the Interrupt Polarity Control register 925. System interrupt steering bits 1217–1220, illustrated as system steering bit [3:0] 947 in FIGS. 9E and 9F, and the management interrupt steering bits 1211–1214, illustrated as management steering bit[3:0] 948 in FIGS. 9E and 9F, each cause their respective bits to be directed to the bits 0–9 of the native registers 924 or 925 according to the following table:

TABLE 2

| System/Management Steering bit[3:0] | Native Reg. Bit |
| --- | --- |
| 0000 | no mapping |
| 0001 | reserved |
| 0010 | reserved |
| 0011 | bit 0 |
| 0100 | bit 1 |

TABLE 2-continued

| System/Management Steering bit[3:0] | Native Reg. Bit |
| --- | --- |
| 0101 | bit 2 |
| 0110 | reserved |
| 0111 | bit 3 |
| 1000 | reserved |
| 1001 | bit 4 |
| 1010 | bit 5 |
| 1011 | bit 6 |
| 1100 | bit 7 |
| 1101 | reserved |
| 1110 | bit 8 |
| 1111 | bit 9 |

Using FIG. 9E as an example, if the management steering bit[3:0] 948 have a value of 1110 then the value of bit 3 of register 905 is caused to be stored into bit 8 of register 924 by the management steering destination 946 of the compatibility engine. If the system steering bit[3:0] 947 have a value of 1010, then the value of bit 4 of register 905 is caused to be stored into bit 5 of register 924 by the system steering destination 945 of the compatibility engine. The management steering destination 963 and system steering destination 962 of FIG. 9F operate within the compatibility engine in a similar fashion. As previously discussed, "steering collisions"—where the value of bit 3 and bit 4 or bits 2 and bit 3 are written to the same register bit of the native register 924 or 925—cause the compatibility engine to perform a logical AND operation on the value of bit 3 and bit 4 or bit 2 and bit 3 before being stored into register 924 or 925 at the designated bit location.

To further accomplish interrupt compatibility, the system interrupt steering bits and the management interrupt steering bits need to be properly mapped. The system interrupt steering bits 1125–1128 of FIG. 11 are directly mapped one-one by the compatibility engine, into the system interrupt steering bits 1217–1220 of FIG. 12. The management interrupt steering bits 1121–1124 of FIG. 11 are directly mapped one-one by the compatibility engine, into the management interrupt steering bits 1211–1214 of FIG. 12. In previous versions of hardware, the wake-up interrupt signal was unavailable so that in a compatibility mode—using versions of software written for the previous versions of hardware—the wake-up steering bits are set (0000) so that, the wake up interrupt signal 1266 is not mapped into any IRQ pad 1200–1209.

Once these values are properly stored in the native registers 924 and 925, the values therein may be used to properly control a circuit, such as FIG. 13, instanciated as circuits 1399A–1399J of FIG. 15. Bit 0 of register 924 and 925 would control circuit 1399A, bit 1 of register 924 and 925 would control circuit 1399B, bit 2 of register 924 and 925 would control circuit 1399C, and so on. In a non-native mode of operation, the compatibility engine—when a change in the system interrupt steering bits or management interrupt steering bits occurs—the mapping operation by the compatibility engine is once again performed, in order to properly determine the type of interrupt output that is selected for a given pad. The condition of a "steering collision" is also reevaluated upon a change in the system interrupt steering bits or management interrupt steering bits.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that other mapping techniques or templates could be used to map the bits of registers within the A register set 220 to bits within registers of the B register set 320.

What is claimed is:

1. A PCMCIA host adapter apparatus providing register and interrupt compatibility under either a PCI or ISA bus environment, the apparatus being capable of accepting an interrupt request signal directed to one of a plurality of differing integrated circuits, steering the interrupt request signal to a selected one of a plurality of interrupt pads, and selectively shaping the interrupt request signal output through the selected one of the plurality of interrupt pads, comprising:

means for detecting an interrupt request signal;

means for selecting one of a plurality of interrupt pads to which to steer the interrupt request signal according to a selected operating mode of the PCMCIA host adapter based upon a sensing of attempted register access under either a PCI or ISA bus environment, the means for selecting being coupled to the means for detecting;

means for steering the interrupt request signal to the selected one of the plurality of interrupt pads, the means for steering being coupled to the means for selecting; and means for shaping the interrupt request signal into a selected shape at each interrupt pad before it is output through the selected one of the plurality of interrupt pads, the means for shaping being coupled to a respective one of the plurality of interrupt pads.

2. The apparatus as claimed in claim 1 wherein the means for shaping independently controls for each of the plurality of interrupt pads whether the interrupt request signal is output as an active high signal or an active low signal.

3. The apparatus as claimed in claim 2 wherein the means for shaping independently controls for each of the plurality of interrupt pads whether the interrupt request signal is output as a pulse signal or a level signal.

4. A PCMCIA host adapter apparatus providing register and interrupt compatibility under either a PCI or ISA bus environment, the apparatus being capable of accepting an interrupt request signal directed to one of a plurality of differing integrated circuits, steering the interrupt request signal to a selected one of a plurality of interrupt pads, and selectively shaping the interrupt request signal output through the selected one of the plurality of interrupt pads, comprising:

a detecting logic circuit for detecting an interrupt request signal;

a selecting logic circuit for selecting one of a plurality of interrupt pads to which to steer the interrupt request signal according to a selected operating mode of the PCMCIA host adapter based upon a sensing of attempted register access under either a PCI or ISA bus environment, the selecting logic circuit being coupled to the detecting logic circuit;

a steering logic circuit for steering the interrupt request signal to the selected one of the plurality of interrupt pads, the steering logic circuit being coupled to the selecting logic circuit; and a shaping logic circuit for shaping the interrupt request signal into a selected shape at each interrupt pad before it is output through the selected one of the plurality of interrupt pads, the shaping logic circuit being coupled to a respective one of the plurality of interrupt pads.

5. The apparatus as claimed in claim 4 wherein the shaping logic circuit independently controls for each of the plurality of interrupt pads whether the interrupt request signal is output as an active high signal or an active low signal.

6. The apparatus as claimed in claim 5 wherein the shaping logic circuit independently controls for each of the plurality of interrupt pads whether the interrupt request signal is output as a pulse signal or a level signal.

7. A method for providing PCMCIA host adapter register and interrupt compatibility under either a PCI or ISA bus environment by accepting an interrupt request signal directed to any one of a plurality of differing integrated circuits, steering the interrupt request signal to a selected one of a plurality of interrupt pads, and selectively shaping the interrupt request signal output through a selected one of the plurality of interrupt pads comprising the steps of:

detecting an interrupt request signal;

selecting one of a plurality of interrupt pads to which to steer the interrupt request signal according to a selected operating mode of the PCMCIA host adapter based upon a sensing of attempted register access under either a PCI or ISA bus environment;

steering the interrupt request signal to the selected one of the plurality of interrupt pads; and shaping the interrupt request signal into a selected shape before it is output through the selected one of the plurality of interrupt pads.

8. The method as claimed in claim 7 wherein the step of shaping the interrupt request signal further comprises the step of independently controlling for each of the plurality of interrupt pads whether the interrupt request signal is output as an active high signal or an active low signal.

9. The method as claimed in claim 8 wherein the step of shaping the interrupt request signal further comprises the step of independently controlling for each of the plurality of interrupt pads whether the interrupt request signal is output as a pulse signal or a level signal.

10. A PCMCIA host adapter apparatus providing register and interrupt compatibility under either a PCI or ISA bus environment and allowing a system to access a plurality of differing register sets on a single integrated circuit and accept interrupt request signals directed to one of a plurality of differing integrated circuits, comprising:

first means for detecting when one of the plurality of differing register sets is being accessed by the system for completion of an operation;

means for determining, coupled to the first means for detecting, for determining which one of the plurality of differing register sets is being accessed by the system;

means for completing the operation, coupled to the first means for detecting and the means for determining, for completing the operation and notifying the system;

second means for detecting, coupled to the means for completing, for detecting an interrupt request signal;

means for selecting coupled to the second means for detecting for selecting one of the plurality of interrupt pads to which to steer the interrupt request signal according to a selected operating mode of the PCMCIA host adapter based upon a sensing of attempted register access under either a PCI or ISA bus environment;

means for steering the interrupt request signal to the selected one of the plurality of interrupt pads; and means for shaping the interrupt request signal at each interrupt pad before it is output to the selected one of the plurality of interrupt pads.

11. The apparatus as claimed in claim 10 further comprising a plurality of register sets located physically on the integrated circuit and coupled to the means for completing the operation.

12. The apparatus as claimed in claim 11 further comprising a multiplexer coupled to the means for completing and the plurality of register sets for multiplexing signals from the plurality of register sets.

13. The apparatus as claimed in claim 10 further comprising a single register set under a first operating mode, located physically on the integrated circuit, and coupled to the means for completing the operation, wherein the means for completing the operation further comprises a mapping circuit for mapping accesses to register sets not under the first operating mode into the single register set.

14. The apparatus as claimed in claim 13 wherein the single register set is comprised of parallel registers.

15. The apparatus as claimed in claim 13 wherein the single register set is comprised of serial registers.

16. The apparatus as claimed in claim 13 wherein the operation can be either a read operation or a write operation.

17. The apparatus as claimed in claim 13 wherein the mapping circuit further comprises a compatibility engine coupled to the single register set for mapping bits of the plurality of differing register sets into and out of the single register set when the system attempts an access to a register set not under the first operating mode.

18. The apparatus as claimed in claim 17 wherein each of the plurality of differing register sets have a different address at which they can be accessed.

19. The apparatus as claimed in claim 10 wherein the means for shaping independently controls for each of the plurality of interrupt pads whether the interrupt request signal is output as an active high signal or an active low signal.

20. The apparatus as claimed in claim 19 wherein the means for shaping independently controls for each of the plurality of interrupt pads whether the interrupt request signal is output as a pulse signal or a level signal.

21. A PCMCIA host adapter apparatus providing register and interrupt compatibility under either a PCI or ISA bus environment within a system and having a resident register set under a first operating mode and physically located within the system, which allows accesses and interrupt request signals directed towards a non-resident register set not under the first operating mode, comprising:

a detecting logic circuit for detecting when an interrupt request signal is directed to the register set under the first operating mode and when an interrupt request signal is directed to a register set not under the first operating mode;

a native interrupt access logic circuit coupled to the detecting logic circuit for passing the interrupt request signal through the system to an appropriate interrupt pad when the interrupt request signal is directed to the register set under the first operating mode; and a non-native interrupt access logic circuit coupled to the detecting logic circuit for mapping interrupt information about an interrupt request signal directed to a register set not under the first operating mode into an appropriate location within the resident register set.

22. The compatibility engine apparatus as claimed in claim 21 further comprising:

a. a steering logic circuit coupled to the native and non-native interrupt access logic circuits for steering an interrupt request signal to an appropriate interrupt pad; and b. a shaping logic circuit coupled to the steering logic circuit for shaping the interrupt request signal at the appropriate interrupt pad before it is output to a peripheral.

23. The apparatus as claimed in claim 21 wherein the detecting logic circuit determines to which of the plurality of differing integrated circuits the interrupt request signal is directed by determining a register address to which an interrupt request signal was sent.

24. A PCMCIA host adapter apparatus providing resister and interrupt compatibility under either a PCI or ISA bus environment and generating interrupts within a system having a plurality of peripherals, the interrupt apparatus comprising:

a plurality of interrupt pads, each pad configured for coupling to one of the plurality of peripherals for sending an interrupt request signal to the peripheral;

a detecting logic circuit for detecting when an interrupt request signal is generated and determining to which of the plurality of interrupt pads the interrupt request signal should be directed;

a steering logic circuit coupled to the detecting logic circuit and to the plurality of interrupt pads for steering an interrupt request signal to a selected interrupt pad, wherein the steering logic circuit determines to which of the plurality of interrupt pads the interrupt request signal should be directed according to a selected operating mode of the PCMCIA host adapter based upon a sensing of attempted register access under either a PCI or ISA bus environment; and a shaping logic circuit coupled to the plurality of interrupt pads for shaping an interrupt request signal at each interrupt pad before it is output in a selected form to a peripheral coupled to the interrupt pad, wherein the shaping logic circuit further comprises an active-high/active-low control circuit for independently controlling for each of the plurality of interrupt pads whether the interrupt request signal is output as an active high signal or an active low signal.

25. The interrupt apparatus as claimed in claim 24 wherein the shaping logic circuit further comprises a pulse/level control circuit for controlling whether the interrupt request signal is output as a pulse signal or a level signal.

* * * * *